United States Patent [19]

Baker

[11] 4,354,400
[45] Oct. 19, 1982

[54] HYDROMECHANICAL TRANSMISSION

[75] Inventor: Willard C. Baker, Columbus, Ohio

[73] Assignee: Dana Corporation, Toledo, Ohio

[21] Appl. No.: 182,915

[22] Filed: Sep. 2, 1980

Related U.S. Application Data

[63] Continuation of Ser. No. 878,346, Feb. 16, 1978, abandoned.

[51] Int. Cl.³ .................. F16H 47/04; F16H 37/06
[52] U.S. Cl. .................................. 74/687; 74/720.5
[58] Field of Search ........................ 74/687, 720.5

[56] References Cited

U.S. PATENT DOCUMENTS

| | | | |
|---|---|---|---|
| 2,173,856 | 9/1939 | Orshansky, Jr. | 74/189.5 |
| 3,204,486 | 9/1965 | DeLalio | 74/687 |
| 3,300,000 | 1/1967 | Stoyke | 74/687 |
| 3,446,093 | 5/1969 | Orshansky, Jr. | 74/687 |
| 3,455,183 | 7/1969 | Orshansky, Jr. | 74/687 |
| 3,455,184 | 7/1969 | Frandsen et al. | 74/687 |
| 3,468,192 | 9/1969 | Nasvytis | 74/682 |
| 3,470,769 | 10/1969 | Livezey | 74/720.5 |
| 3,496,803 | 2/1970 | Whelahan | 74/687 |
| 3,503,281 | 3/1970 | Gsching et al. | 74/732 |
| 3,580,107 | 5/1971 | Orshansky, Jr. | 74/687 |
| 3,597,998 | 8/1971 | Ebert | 74/687 |
| 3,733,924 | 5/1973 | Zentz et al. | 74/687 |
| 3,962,915 | 12/1960 | Wiggermann | 74/687 |
| 3,990,327 | 11/1976 | Margolin | 74/687 |
| 4,008,628 | 2/1977 | Orshansky, Jr. | 74/687 |

FOREIGN PATENT DOCUMENTS

| | | | |
|---|---|---|---|
| 1162937 | 9/1958 | France | |
| 70206 | 3/1959 | France | 74/687 |

Primary Examiner—Leslie Braun
Attorney, Agent, or Firm—Robert M. Leonardi

[57] ABSTRACT

A heavy duty hydromechanical transmission adapted for agricultural and industrial type tractors and for heavy duty construction type vehicles as well as line haul tractors is disclosed. The transmission utilizes an input shaft which is driven by a power source and drives dual planetary gear sets. These planetary gear assemblies are each geared to two separate variable displacement hydrostatic pump and/or motor units which are arranged in a closed hydrostatic fluid flow circuit. Each planetary gear set also drives a countershaft which is utilized as part of a multispeed transmission. The hydrostatic units are used as variable displacement pumps or motors to obtain smooth starting and to eliminate the need for a conventional master clutch normally used for starting a vehicle or for shifting gears. These units are also used to provide the high-starting torque through hydraulic torque regeneration. Hydrostatic transfer of power between fixed gear ratios (bases) creates an uninterrupted power flow over the entire speed range of the vehicle. Either or both of the hydrostatic units is available to be driven as a pump to provide high hydraulic line pressure for auxiliary hydraulic power take off devices such as concrete mixer drums, secondary vehicle drive axles, vehicle hoist mechanisms, etc. These units may be utilized as pumps to provide high levels of modulated dynamic braking horsepower. They may also be used to extend the limits of vehicle operation by providing a hydraulic overdrive which also allows an associated engine to operate at lower and quieter speeds and in a more efficient fuel economy range.

18 Claims, 18 Drawing Figures

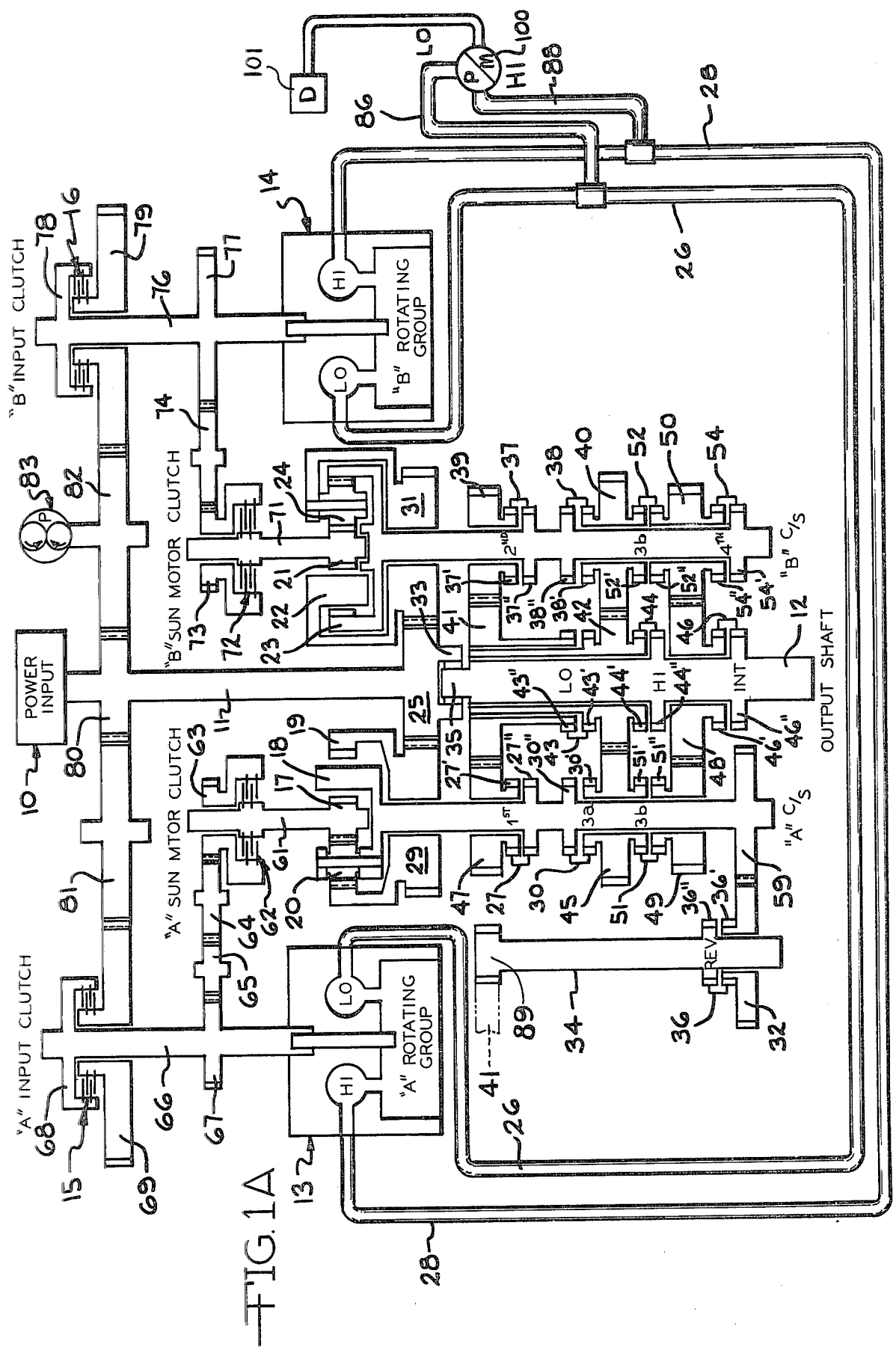

HYDROMECHANICAL TRANSMISSION

This is a continuation of application Ser. No. 878,346, filed on Feb. 16, 1978 now abandon.

BACKGROUND OF THE INVENTION

This invention relates generally to transmissions and more particularly to hydromechanical transmissions utilizing planetary gear assemblies and variable displacement hydrostatic units.

In heavy duty on/off highway vehicles such as large trucks and off-highway vehicles such as construction and agricultural vehicles, full power and torque drive are often required at all operating speeds. Smooth, uninterrupted high torque and power flow during acceleration are desirable for optimum performance of the vehicle. Oftentimes, a break in the power flow to the vehicle wheels may cause the vehicle to stall, especially if adverse ground conditions and extreme loads exist. For example, a farm tractor or a bulldozer may become stalled by an instantaneous break in the power train, such as by declutching the power train to shift gears.

Power shift transmissions have come a long way in solving these drive train interruption problems, but are limited in range and lose appreciable output horsepower between gear ratio changes. Known automatic transmissions lack the efficiency available in manual shift transmissions. However, manual shift transmissions are somewhat limited because most are driven exclusively through mechanical gearing and do not provide maximum vehicle performance in off-highway terrain. Power shift transmissions used in conjunction with torque converters may be abused by excessive operation at or near stall conditions which may cause overheating. Efforts to provide adequate cooling can be expensive and results in high pump losses with lower overall efficiency.

Vehicle efficiency may be best expressed in terms of minimum fuel consumption. Maximum fuel economy for a vehicle is obtained when the engine, transmission, and drive train are operating at peak efficiency. Optimum overall efficiency may be obtained by operating at the best engine speed for each road load condition. This is particularly important for the heavy duty line haul vehicle applications where a considerable amount of miles are logged on each vehicle per year.

Collateral uses for hydromechanical transmissions have been suggested, such as dynamic braking and regenerative starting of a vehicle by hydraulic power. These features are especially desirable for heavy duty vehicles such as on/off highway trucks, but heretofore known transmissions have not been able to provide these features without the addition of several expensive and complicated accessories which would not normally be included on the vehicle.

Power take-off (PTO) devices are also common in several types of heavy duty vehicles such as cement mixers, refuse collectors, etc. These PTO's can be either mechanically or hydraulically powered. Hydraulic PTO's can be very complex and expensive to install. They must produce a constant source of high pressure hydraulic fluid to be most effective. In previously known hydromechanical transmissions the fluid manifold includes fluid passageways which may alternatingly carry high and then low pressure fluid during operation. This causes problems because the associated hydraulic PTO pump or motor will correspondingly be driven forward and backward. Still other types of transmissions may provide adequate fluid pressure only during specific modes of operation, such as when the transmission is in neutral.

A further objection to previous known hydromechanical transmissions is that the hydraulic horsepower requirements as well as the hydrostatic unit operating speeds and pressures are quite high which results in loss of efficiency, high heat rejection, and objectionable noise levels.

SUMMARY OF THE INVENTION

The present invention is a hydromechanical split-torque transmission (1) adapted for smooth starting by utilizing high hydraulic regenerative starting torque, and (2) adapted for smooth, uninterrupted full power flow between fixed gear ratios, thereby producing an infinite number of continuously varying torque ratios throughout an entire vehicle speed range. This invention allows an associated engine to operate at a nearly maximum input horsepower, producing maximum output torque and horsepower, substantially throughout the entire operating speed range.

In the preferred embodiment, power between fixed gear ratios is provided by a hydraulic system including dual variable displacement hydraulic units.

The variable displacement units may be used to provide a torque boost for starting a vehicle and extend the limits of vehicle operation by providing a hydraulic overdrive which also allows the engine to operate at lower and quieter speeds and in a more efficient specific fuel economy range. The variable displacement units may be utilized as pumps to provide high levels of modulated dynamic braking horsepower. Vehicle auxiliary devices such as hydraulic motors can also be powered from the pressurized fluid produced by the hydraulic system. These motors can operate devices such as rotary mixing drums, compartment packers, etc. which improves the vehicle utilization for various applications.

BRIEF DESCRIPTION OF THE DRAWINGS

FIG. 1A is a schematic diagram of a presently preferred embodiment of the transmission of the present invention.

DESCRIPTION OF A PREFERRED EMBODIMENT

Figure 1:
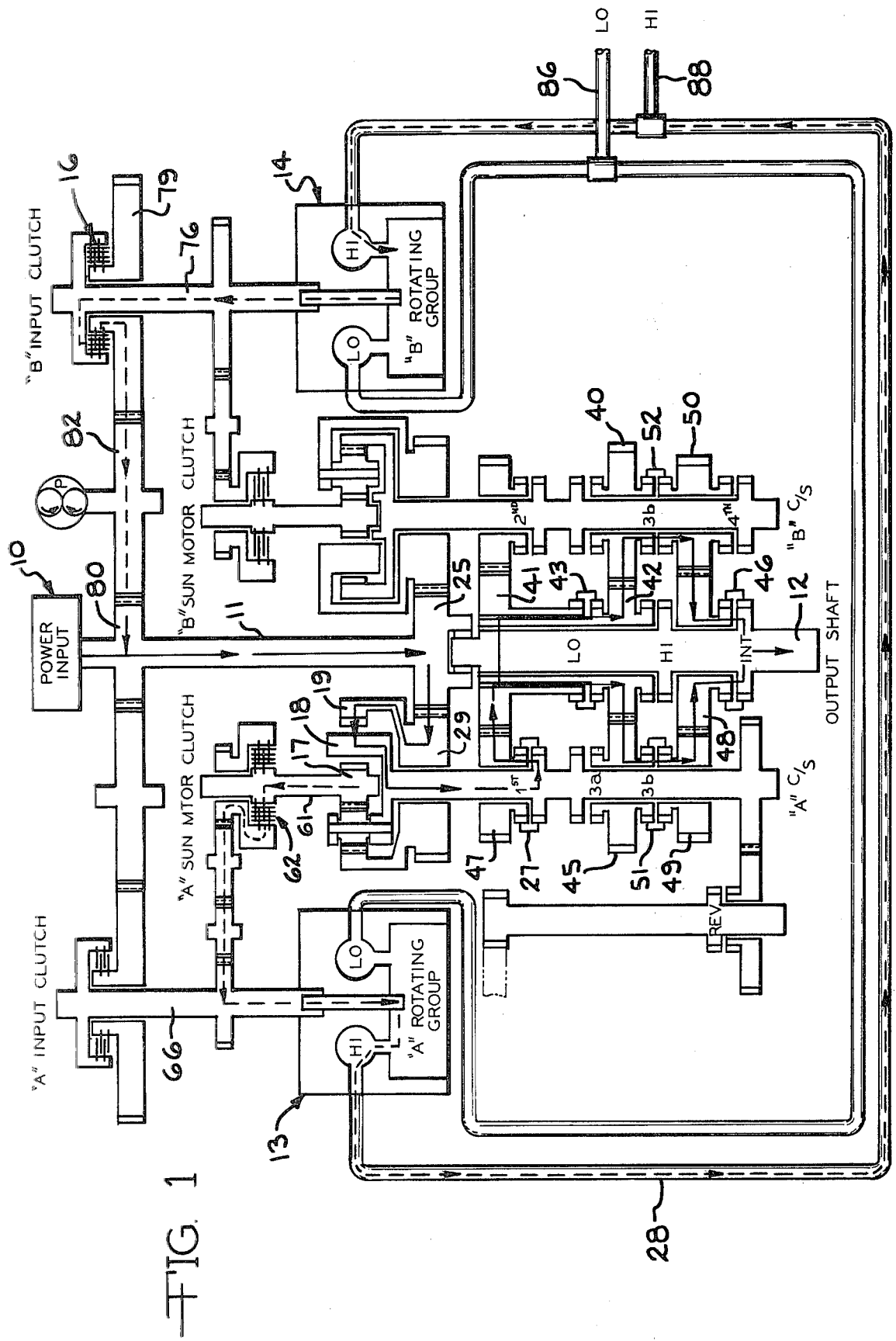
FIGS. 1-17 are schematic diagrams of the transmission of FIG. A showing specific clutch and gear drive connections and power flow paths for several conditions of operation.

A preferred embodiment of the transmission of the present invention adapted especially for use in a heavy duty vehicle such as a line haul tractor is illustrated in FIG. 1A.

In the preferred embodiment a source of power 10 from a unit such as a diesel engine is connected to an input shaft 11 of the transmission of the present invention. Power is transmitted from the input shaft 11 through the transmission to an output or main shaft 12 which is connected through the vehicle drive train (not shown) to the vehicle wheels. The output shaft 12 is mounted in the transmission on the same longitudinal axis as is the input shaft 11.

The transmission comprises two countershafts which are designated the "A" countershaft and the "B" countershaft. The "A" and "B" countershafts are parallel to the input and output shafts 11 and 12 and are equally and symmetrically spaced on either side thereof. This arrangement permits the use of identical gearing on each countershaft. Each of the countershafts is drivingly connected to its own planetary assembly. The "A" planetary assembly connected to the "A" countershaft comprises a sun pinion 17, planet gears 20 and their carrier 18, and a ring gear 19. The "B" planetary assembly, connected to the "B" countershaft, comprises a sun pinion 21, planet gears 24 and their carrier 22, and a ring gear 23.

It should be particularly noted that the gearing from the input shaft 11 to the "A" and "B" planetary assemblies and from these planetary assemblies to the respective countershafts is through different planetary components. The input shaft 11 includes a gear 25 integrally disposed on its inward end portion which is drivingly meshed with a gear 29 rigidly affixed to the ring gear 19 of the "A" planetary assembly. The "A" countershaft is rigidly affixed to the carrier 18 of the "A" planetary. The carrier 22 of the "B" planetary assembly is drivingly engaged with the input gear 25 through gear 31 which is affixed thereto. The "B" countershaft is drivingly connected to the "B" planetary assembly through the ring gear 23. These dissimilar planetary component connections give a broader speed range to the respective countershafts and allow the use of identical gearing on the "A" and "B" countershafts which simplifies the transmission and provides other advantages as will hereinafter be discussed.

The "A" planetary unit may be considered an underdrive planetary because the output speed of the carrier 18 and "A" countershaft is less than the input speed of the ring gear 19 when the sun pinion 17 is held against rotation. The "B" planetary unit may be considered an overdrive unit because holding the sun pinion 21 against rotation will result in a greater output speed of the ring gear 23 and the "B" countershaft than the input speed of the carrier 22.

The reaction force required for driving through either planetary assembly is provided through the respective sun gears. With no reaction force, the sun gear of each planetary will rotate faster than the planetary component which is driven by the input shaft (i.e. the ring gear 19 or the carrier 22). The sun pinions can therefore be considered as "multipliers", as the torque applied through them is multiplied through either a ring gear or a carrier. Smaller hydraulic units (hereinafter described) can be used to create a relatively large reaction force through the sun gears. Control of the planetaries can be achieved with a relatively small amount of hydraulic horsepower, which results in a higher overall efficiency of the transmission. The low values of hydraulic horsepower (zero to 10%) required for the transition between bases contributes to good overall efficiency, minimum heat rejection, and low noise level.

The transmission includes a hydraulic system comprising two hydraulic or hydrostatic units which are generally known as variable displacement piston type pump/motors. These hydraulic units may be of the type shown in U.S. Pat. No. 3,803,987, issued Apr. 16, 1974, the disclosure of which incorporated herein by reference. The hydraulic units are designated as the "A" hydraulic unit 13 and the "B" hydraulic unit 14 as they are associated with the "A" and "B" planetary assemblies and countershafts, respectively. Each hydraulic unit is fully variable from a plus to a minus displacement and is capable of either clockwise or counterclockwise rotation. A change in direction of rotation of a hydraulic unit coverts the unit from a pump to a motor or from a motor to a pump. The hydraulic system divides power flow through the "A" and "B" countershafts to provide uninterrupted, variable torque drive throughout the speed range of the output shaft 12. It also provides high starting torque for smooth starts and extends the limits of vehicle operation by providing overdrive. With proper controls the hydraulic system generally allows the engine to operate in its most efficient and fuel economical speed range, regardless of output shaft speed.

Each hydraulic unit is selectively drivingly engageable with the input shaft 11 through two distinct gear paths. Input drive gear 80 is rigidly affixed to the input shaft 11 and drivingly meshes with gears 81 and 82 which are drivingly engaged with gears 69 and 79, respectively. An "A" input friction clutch 15 is formed between the gear 69 and an annular projection 68 on an "A" hydraulic unit drive shaft 66. Similarly, a "B" hydraulic unit drive shaft 76 includes an annular projection 78 which is selectively drivingly engageable with the drive gear 79 through a "B" input friction clutch 16.

As previously noted, the "A" countershaft is connected to the carrier 18 of the "A" planetary and the "B" countershaft is connected to the ring gear 23 of the "B" planetary. However, torque cannot be transmitted from either planetary assembly to its respective countershaft until a reaction force appears through the respective sun gear.

Each sun gear 17 and 21 is integrally formed on the end of a shaft 61 and 71, respectively. Each shaft 61 and 71 is selectively drivingly engageable with the hydraulic unit drive shafts 66 and 76, respectively, through friction reaction clutches 62 (denoted as the "A" Sun Motor Clutch in the drawings) and 72 (denoted as the "B" Sun Motor Clutch), respectively. The reaction clutches 62 and 72 are adapted to selectively lock the shafts 61 and 71 to the sun shaft gears 63 and 73, respectively. This arrangement provides the second power path from the input shaft 11 to each hydraulic unit. It should be noted that the "A" and "B" Sun Motor Clutches 62 and 72 are required in the preferred embodiment only for the purpose of synchronization of the dog clutches on the output shaft and countershaft. Clutches such as these may not be required in a similar transmission utilizing a different synchronization system.

The "A" and "B" countershafts rotate in the same direction during operation of the transmission. The reaction force from the respective sun pinions must be applied in a direction opposite to that of the countershafts. Each sun pinion must therefore apply a reaction force in the same direction as the other. Reaction forces from the hydraulic input shafts 66 and 76 are initially in opposite directions. An additional gear is therefore added between one of the shafts 66 and 76 and its respective sun pinion.

The "A" hydraulic unit drive shaft 66 includes an integrally formed gear 67 adapted for driving engagement with the "A" sun motor clutch gear 63 through two relatively small diameter intermediate gears 64 and 65. The "B" hydraulic unit drive shaft 76 includes an integrally formed gear 77 adapted for driving engagement with the "B" sun motor clutch gear 73 through one relatively large diameter gear 74.

Because the "A" planetary is an underdrive planetary, the size of the gears 63, 64, 65, and 67 are smaller than gears 73, 74 and 77 associated with the "B" planetary. Rotational Speed of the "A" sun pinion 17 is thereby increased with respect to the "B" sun pinion 21. These gears are preferably designed so that the associated hydraulic units 13 and 14 have the same peak rotational speed.

The friction clutches 62 and 72, as well as clutches 15 and 16 can be selectively engaged and disengaged by automatic transmission controls to create distinct power flow paths from the input shaft 11. The controls and the power paths will be discussed more thoroughly hereinafter.

Both hydraulic units 13 and 14 are operable either as a pump (supplier of hydraulic fluid) or as a motor (user of hydraulic fluid). The hydraulic units 13 and 14 are hydraulically interconnected by a manifold having high and low pressure passageways. The manifold includes a conduit or passageway 26 connecting the low pressure sides of each hydraulic unit and a passageway 28 connecting the high pressure sides. The hydraulic units are used as variable displacement pumps or motors to product (1) smooth starting, (2) high-starting torque by regenerating power, (3) hydraulic line pressure to power accessories or auxiliary hydraulic power units, (4) dynamic vehicle braking, (5) infinitely variable transmission ratios between those available from the fixed gearing, and (6) hydraulic overdrive.

The "A" countershaft includes integrally formed dog clutch elements 27" and 30" adapted for clutching gears to the "A" countershaft. Similarly, the "B" countershaft includes integrally formed dog clutch members 37", 38" and 54'.

Three drive gears 45, 47 and 49 are rotatably mounted on the "A" countershaft by means such as bearings, etc. (not shown). Drive gear 47 includes an integrally formed dog clutch member 27' adapted to be locked to the "A" countershaft through the clutch member 27". The drive gear 45 includes a dog clutch member 30' adapted to be locked to the "A" countershaft through the clutch member 30". Drive gear 45 further includes a second dog clutch member 51' adapted for locking engagement with a clutch member 51" on a drive gear 49. The "A" countershaft also carries dog clutch locking members or collars 27, 30, and 51 (shown schematically in the drawings) for effecting the locking engagement between the associated clutch members. It should be noted that clutch 51 is for locking gear 49 to gear 45 rather than to the "A" countershaft.

Similarly, the "B" countershaft includes integrally formed dog clutch members 37", 38" and 54'. Drive gears 39, 40 and 50 are rotatably secured on the "B" countershaft. Gear 39 includes a dog clutch member 37', while gear 40 and 50 each include two integrally formed clutch members 38' and 52', and 52" and 54", respectively. Dog clutch locking members or collars (shown schematically) 37, 38 and 54 are for locking gears 39, 40 and 50, respectively, to the "B" countershaft through their respective clutch elements. Collar 52 is adapted for locking gears 40 and 50 together.

The output shaft 12 includes integrally formed clutch members 44" and 46" adapted for engagement with similar members on associated drive gears. Drive gears 41, 42 and 48 are rotatably mounted on the output shaft 12. Gears 41 and 48 include an integral clutch element 43" and 46', respectively. Gear 42 has two clutch elements 43' and 44'. Clutch collars or locking elements (shown schematically) 44 and 46 are for locking gears 42 and 48, respectively, to the output shaft 12. Clutch collar 43 is for locking drive gear 41 to the gear 42.

The output shaft gear 41 has the largest diameter and number of teeth among the output gears and is therefore designated as "LO" gear. Drive gear 41 is drivingly meshed with identical "A" and "B" countershaft gears 47 and 39, respectively. Output gear 42 has the smallest diameter and number of gear teeth among the output gears and is denoted as "HI" gear. Gear 42 is drivingly engaged with identical countershaft gears 40 and 45. Drive gear 48 provides an output speed intermediate that of the "LO" and "HI" output speeds and is designated as "INT". Identical countershaft gears 49 and 50 are in driving engagement with intermediate gear 48. It can therefore be seen that the output shaft 12 can be driven through various power paths, each involving torque flow through a distinct combination of countershaft and output shaft gears, depending upon the engagement of one or more output shaft clutches and one or more countershaft clutches.

A reverse countershaft 34 is situated adjacent and parallel to the "A" countershaft. A reverse dog clutch member 36" is formed integrally with the shaft 34 and is adapted for engagement with clutch member 36' integrally formed on a reverse gear 32. Gear 32 is rotatably supported on shaft 34 and is in driving engagement with gear 59 integrally formed on the "A" countershaft. Dog clutch collar 36 is adapted for locking the reverse gear 32 to the reverse shaft 34. The reverse shaft 34 is geared to the output shaft 12 such that a reverse rotation of the output shaft is produced when it is driven through the reverse shaft. Pinion 89 on the reverse shaft 34 meshes with gear 41 on the output shaft to provide a low speed high torque reverse drive.

CONDITIONS OF OPERATION

In this presently preferred embodiment there are seven conditions of forward operation wherein torque and power is transmitted exclusively through mechanical gearing. These fixed gear ratio conditions are hereinafter referred to as "bases". During base conditions power is transmitted through only one countershaft. Additionally, there are seven conditions of operation, one prior to achieving each base condition, wherein the torque transmitted through mechanical gearing of one countershaft is hydraulically boosted or assisted through the other countershaft. Infinitely and continuously variable gear ratios are available throughout each of these conditions of operation, which are hereinafter referred to as "modes". The transitions from one condition to the next are smooth uninterrupted full torque power shifts with substantially maximum engine horsepower input and output available throughout the entire speed range. Variable output speed and torque is thereby available for fixed input speed and torque. Infinitely variable torque ranges are produced by a blending of the fixed gear ratios in continuously varying proportions. The number of conditions may, of course, vary depending upon transmission design and the vehicle application. These fourteen conditions of forward operation are illustrated in FIGS. 1 through 14. Additional conditions of operation such as for reverse drive and dynamic braking will also be described hereinafter.

The transmission of the present invention can be adapted for manual, semi-automatic of fully automatic operation. In normal operation of a vehicle the transmission smoothly passes through successive conditions of operation. The previously described dog clutches and friction clutches are selectively engaged and disengaged as will hereinafter be described. Furthermore, the hydraulic units are varied as to their fluid displacements and are periodically changed as to direction of rotation. Controls for automatically or semi-automatically accomplishing these changes may be hydraulic, electrical, or even mechanical. However, these controls form no part of the present invention and will not be discussed in detail.

The operation of the transmission will be described as if it were fully automatically controlled. It should particularly be noted that the hydraulic units are automatically varied from zero swashplate or "hanger" angle (corresponding to zero piston displacement) to full hanger angle (corresponding to maximum displacement and vice versa). Displacement of these units must be coordinated and controlled to properly obtain variable drive torque ratios between fixed gear ratios as will be seen. For example, a gradual change of a hydrostatic unit acting as a pump from zero stroke to full stroke, and a corresponding, subsequent change of a hydrostatic unit acting as a motor from full stroke to zero stroke indicates that the transmission has completed a phase and is in a base condition. As will be seen, during the base conditions there always exists a gear path which is not transmitting torque, and the control system can shift clutches, etc. on this gear path to prepare for operation in the next mode.

The control system should also provide for synchronization of gears for shifting purposes. Alternatively, controls for synchronization can be eliminated if self-synchronizing friction clutches are substituted for the dog clutches. Again, means for synchronizing gears are well known in the art and will not be discussed in detail herein.

Preferably, the control system includes a throttle control whereby transmission output shaft speed is set. With the transmission of the present invention, full the power unit and the input shaft 11 to the output shaft 12.

In the drawings, each dog clutch collar such as 27, 44 and 54 is illustrated as being engaged (i.e. rigidly connecting the teeth of adjacent clutch elements). Thus, when no collar is shown joining two associated clutch elements, the clutch is disengaged and the associated gears or shafts are free to rotate independently of each other. These collars are illustrated diagrammatically because they are well known in the art. It is also well known that a single clutch collar can be adapted to engage two separate but adjacent sets of clutch elements. For example, clutch collars 27 and 30 may be on a single clutch component which lockingly engages the clutch elements 27' and 27" in one position and the clutch elements 30' and 30" in another position. The clutch collars may be controlled mechanically, electrically of hydraulically by the control system. Friction clutches 15, 16, 62 and 72 are schematically shown to be engaged by parallel lines through the adjacent schematic friction plates.

When the transmission is in neutral (FIG. A) both the "A" reaction clutch 62 and the "B" reaction clutch 72 are disengaged. There is no reaction force applied to either of the planetary gear sets and, therefore, no torque is exerted on either the "A" countershaft or the "B" countershaft. However, while in neutral the "A" input clutch 15 and the "B" input clutch 16 may be engaged such that both of the hydraulic units 13 and 14 are driven as pumps and hydraulic power is available for any desired purpose such as the operation of a concrete mixing drum or boom extension cylinders of a portable crane.

A chart summarizing the operational positions of the clutches and hydraulic units in each of the fourteen conditions of forward operation is set forth below. Each of these conditions of forward operation will be discussed in detail hereinafter.

| Condition of Operation | Base or Mode | Hydraulic Units | | Friction Clutches | | | | "A" C/S | | | Dog Clutches "B" C/S | | | | Output Shaft | | |
|---|---|---|---|---|---|---|---|---|---|---|---|---|---|---|---|---|---|
| | | "A" | "B" | 15 | 16 | 62 | 72 | 27 | 30 | 51 | 37 | 38 | 52 | 54 | 43 | 44 | 46 |
| 1 | 1st Mode | P | M | — | E | E | — | E | — | E | — | — | E | — | E | — | E |
| 2 | 1st Base | P* | M* | — | — | E | — | E | — | E | — | — | E | — | E | — | E |
| 3 | 2nd Mode | M | P | — | — | E | E | E | — | E | E | — | E | — | E | — | E |
| 4 | 2nd Base | M* | P* | — | — | E | E | — | — | E | E | — | E | — | E | — | E |
| 5 | 3rd Mode | P | M | — | — | E | E | — | E | E | E | — | E | — | E | — | E |
| 6 | 3rd Base | P* | M* | — | — | E | E | — | E | E | — | — | — | — | — | — | — |
| 7 | 4th Mode | M | P | — | — | E | E | — | E | E | — | — | — | E | — | — | E |
| 8 | 4th Base | M* | P* | — | — | E | E | — | E | — | — | — | — | E | — | — | E |
| 9 | 5th Mode | P | M | — | — | E | E | — | E | — | — | — | — | E | — | E | E |
| 10 | 5th Base | P* | M* | — | — | E | E | — | E | — | — | — | — | — | — | E | — |
| 11 | 6th Mode | M | P | — | — | E | E | — | E | — | — | E | — | — | — | E | — |
| 12 | 6th Base | M* | P* | — | — | E | E | — | — | — | — | E | — | — | — | E | — |
| 13 | 7th Mode | P | M | E | — | — | E | — | — | — | — | E | — | — | — | E | — |
| 14 | 6th Geared Mode | M* | M* | — | E | — | E | — | — | — | — | E | — | — | — | E | — | torque and horsepower are available at all throttle settings (i.e. throughout the vehicle speed range). Therefore, in vehicles such as bulldozers or farm tractors, full power is available at optimum engine speeds and low vehicle speeds such that traction problems can be virtually eliminated.

OPERATION

The power unit for which the presently described transmission is designed is a high horsepower Diesel engine. A constant engine and input shaft speed of 1000 rpm. will be assumed in tracing the flow of power from In the above chart "E" represents an engaged clutch, "P" represents a hydraulic unit in its pump phase, "P*" represents a pump at full stroke, "M" represents a hydraulic unit M its motor phase, and "M*" represents a motor at zero stroke.

In operation, an automatic transmission control is set by the vehicle operator for automatic operation from a dead stop. FIG. 1 illustrates the first condition of operation which consists of a regenerative start from a dead stop with the transmission in the first mode (operating between regenerative start and first base). The power flow from the engine 10 to the output shaft 12 in the regenerative start mode is illustrated by the arrows in FIG. 1.

For regenerative starting, the "B" input friction clutch 16 and the "A" reaction clutch 62 are each engaged. The clutch 16 drivingly engages the "B" hydraulic unit drive shaft 76 with the input shaft 11 as previously described. The clutch 62 connects the "A" sun gear shaft 61 to the "A" hydraulic unit drive shaft 66. Countershaft dog clutches 27, 52 and 51, and output shaft 43 and 46 are also engaged, thereby drivingly connecting the associated gears or shafts.

It can now be seen that power is transmitted from the rotating input shaft 11 through gears 25 and 29 to the "A" planetary assembly ring gear 19. The planet carrier 18 is mechanically driven by the ring gear 19, thereby driving the "A" countershaft. First gear 47 is driven by the "A" countershaft. Therefore, gears 41, 42, 45, 49 and 48 are successively driven, with output gear 48 driving the output shaft 12.

A split torque and power path is created by the engagement of clutch 52. Output shaft gear 42 simultaneously drives identical countershaft gears 45 and 40. Gear 40 transmits power to gear 50 and then to output shaft gear 48. Thus, power is divided essentially equally between the identical sets of gears 45 and 49, and 40 and 50 when the transmission is operated in the lower gears. This permits the use of smaller countershaft gears such as 40, 45, 49 and 50 because less torque is carried by them in their highest torque carrying conditions. Substantial savings in manufacturing costs can thereby be realized. A smaller and more efficient transmission is also created.

The outut shaft 12 is connected to the driving wheels of the vehicle. The load upon the vehicle creates a reaction force through the drive train back to the "A" planetary assembly which has a tendency to prevent rotation of the planet carrier 18. Rotation of the ring gear 19 has a tendency to rotate the sun gear 17, the shaft 61, and ultimately the "A" hydraulic unit drive shaft 66.

In the regenerative starting mode the "A" hydraulic unit 13 operates as a pump powered by the drive shaft 66. Unit 13 pumps high pressure fluid through the high pressure side 28 of the manifold leading to the "B" hydraulic unit 14 which operates as a motor. High pressure fluid forced through the unit 14 drives the "B" hydraulic unit drive shaft 76 which drives gear 79 through the engaged friction clutch 16. A contribution to power is then made through gears 82 and 80 to the input shaft 11. It should be noted that hydraulic power is available for driving auxiliary devices during the regenerative start mode, as well as all other drive conditions, by utilizing pressurized fluid from the manifold take off 88 to drive a motor, such as 100 (see FIG. A), and then returning the fluid through the conduit 86.

In the regenerative start mode hydraulic power is used to increase the input shaft torque when the output shaft speed is between zero (stall speed) and first base condition. By modulating the hydraulic units, hydraulic power is used to multiply the apparent power supplied from the engine to the input shaft. At stall speed, the "A" hydrostatic unit 13 is operating as a pump at partial stroke while the "B" hydrostatic unit 14 is operating as a motor at full stroke. Gradually by automatic controls the "A" unit 13 is brought to full stroke and then the "B" unit 14 is reduced to zero stroke. As the "B" unit 14 approaches zero stroke it accepts decreasingly lesser amounts of hydraulic fluid from the "A" unit 13. The "B" unit acts as a blocking force on the "A" unit, slowing the rotation of the "A" unit. When the "B" unit reaches zero hanger angle it accepts essentially no fluid. The "A" unit thereupon is slowed to a stop.

As the "A" unit slows, it proportionally decreases the speed of the "A" planetary sun shaft 61 and sun gear 17. This causes an increase in speed of the "A" countershaft. When the "A" sun gear stops, the "A" countershaft is at maximum speed for this first condition of operation (i.e. regenerative start to first base condition). In the preferred embodiment, assuming the input shaft 11 is rotating at 1000 rpm. the output shaft 12 will be rotating at about 150 rpm.

Figure 2:
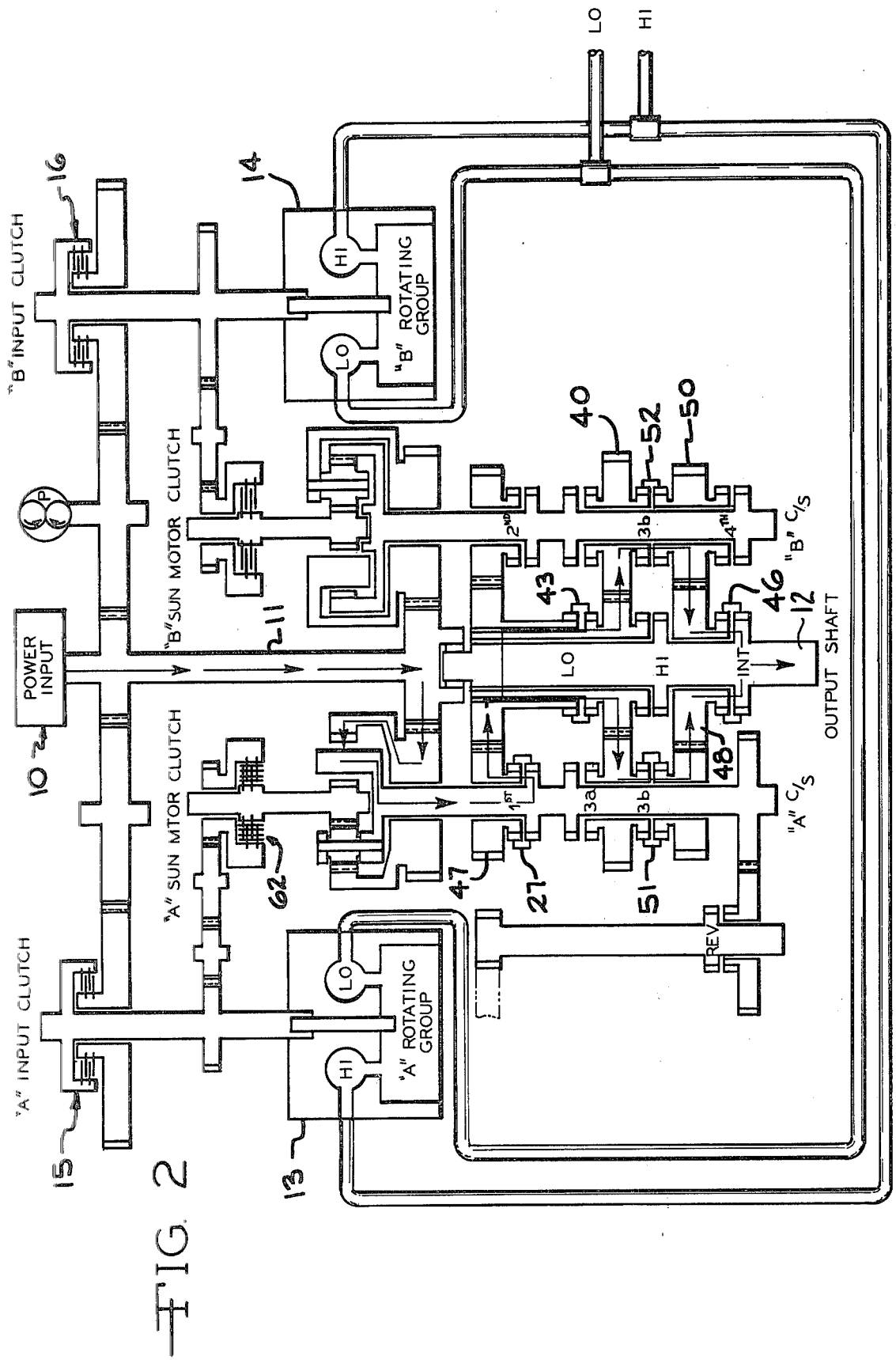

In the second condition of operation (FIG. 2) no hydraulic power is transmitted and the power flow is completely mechanical from the input shaft 11, through the "A" planetary assembly, the "A" countershaft, and through the transmission gear train as shown in FIG. 2. This second condition of operation is also termed the first gear base condition because of the full mechanical drive through first fixed gear ratio. It should be noted that the split torque path through gears 40 and 50 is utilized in the first base condition. The "B" input clutch 16 is automatically disengaged in the second condition with no effect upon the operation of the transmission because there is essentially no hydraulic contribution to power.

Figure 3:
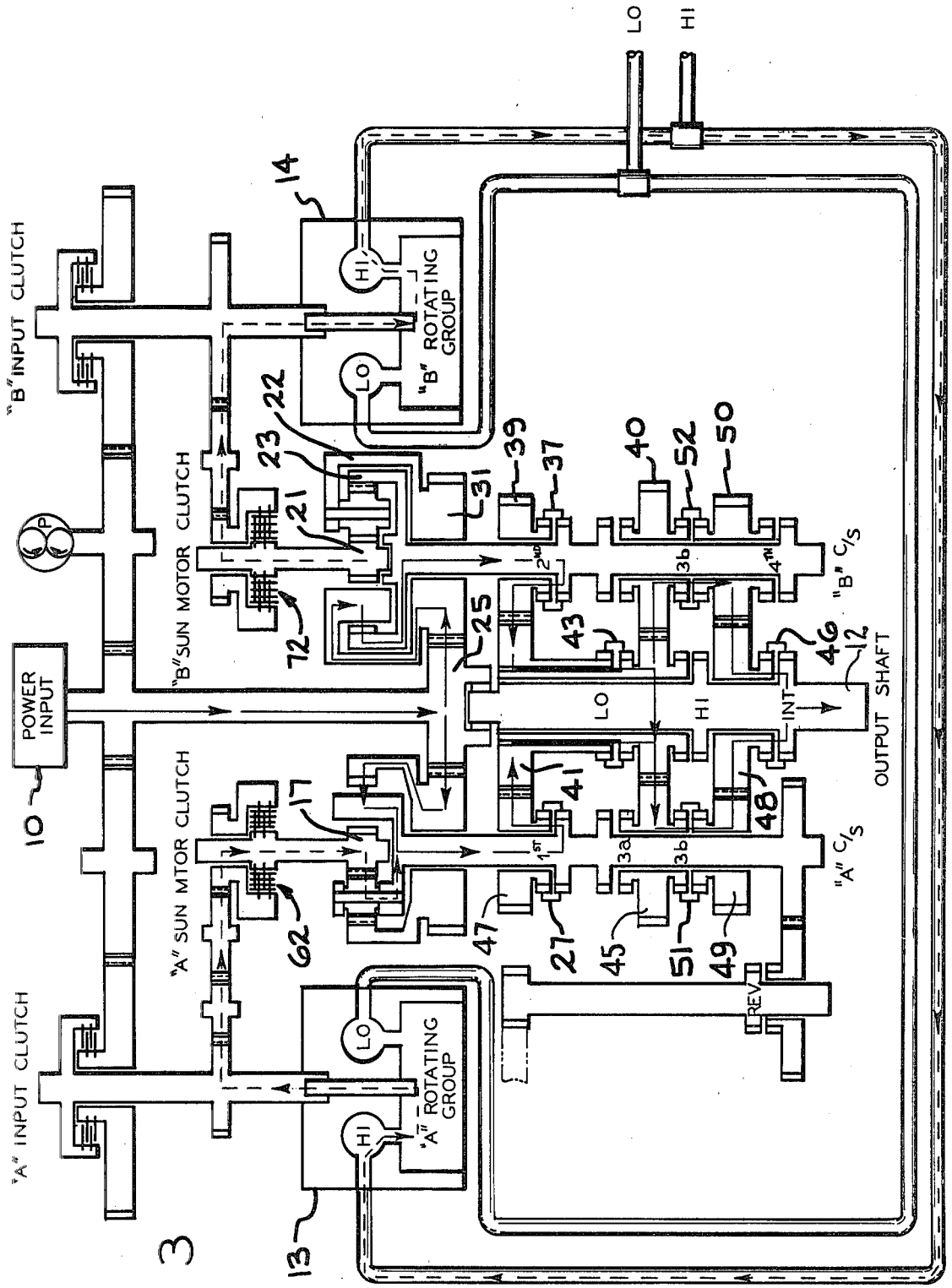

A further automatic transmission shift occurs to allow the transmission to enter the third condition of operation between first and second bases (FIG. 3). The "B" sun motor friction clutch 72 is engaged to hydraulically drivingly connect the "A" and "B" planetary units. "B" countershaft dog clutch 37 is engaged to allow the "B" planetary unit to drive the output shaft 12 through second gear 39.

At the end of the second condition and at the beginning of the third condition of operation the "B" hydrostatic unit 14 is at zero stroke and the "A" hydrostatic unit 13 is at full stroke. Through the aforementioned automatic clutch shifts the direction of rotation of each hydraulic unit is reversed whereby the "B" unit 14 is transformed into a hydraulic pump which supplies pressurized fluid to the "A" unit 13 which now acts as a motor.

In the third condition of operation power continues to flow from the "A" countershaft through the first speed gear 47 as in the second condition previously described. However, the input shaft 11 also drives the carrier 22 of the "B" planetary through gears 25 and 31. The "B" sun gear 21 acts as a reaction member so that a portion of the drive force passes through the "B" planetary carrier 22 into the "B" ring gear 23 and the "B" countershaft. This second source of driving force is transmitted through second gear 39 to output shaft gear 41 which contributes to the force applied by the "A" countershaft, through the aforementioned first base power path. Again, the identical sets of smaller gears 45 and 49, and 40 and 50 are utilized to carry the torque.

The input shaft 11 also causes the "B" sun gear 21 to be driven by the "B" carrier 22. This causes the "B" hydraulic unit 14 to be driven as a pump starting from zero stroke, its position in the second condition of operation. Unit 14 drives unit 13, now a motor at a full stroke, which adds power to the "A" countershaft through the "A" sun gear 17. Throughout this third condition the "B" unit 14 is automatically varied from zero to full stroke, and then the "A" unit 13 is varied from full to zero stroke. The variable speed applied to the "A" sun gear 17 by the variable displacement hydraulic units 13 and 14 results in variable torque and speed ratio from first base to second base, i.e. throughout the third condition of operation. Vehicle load is therefore being shared in continuously varying proportions by the "A" and "B" countershafts and associated gearing.

Figure 4:
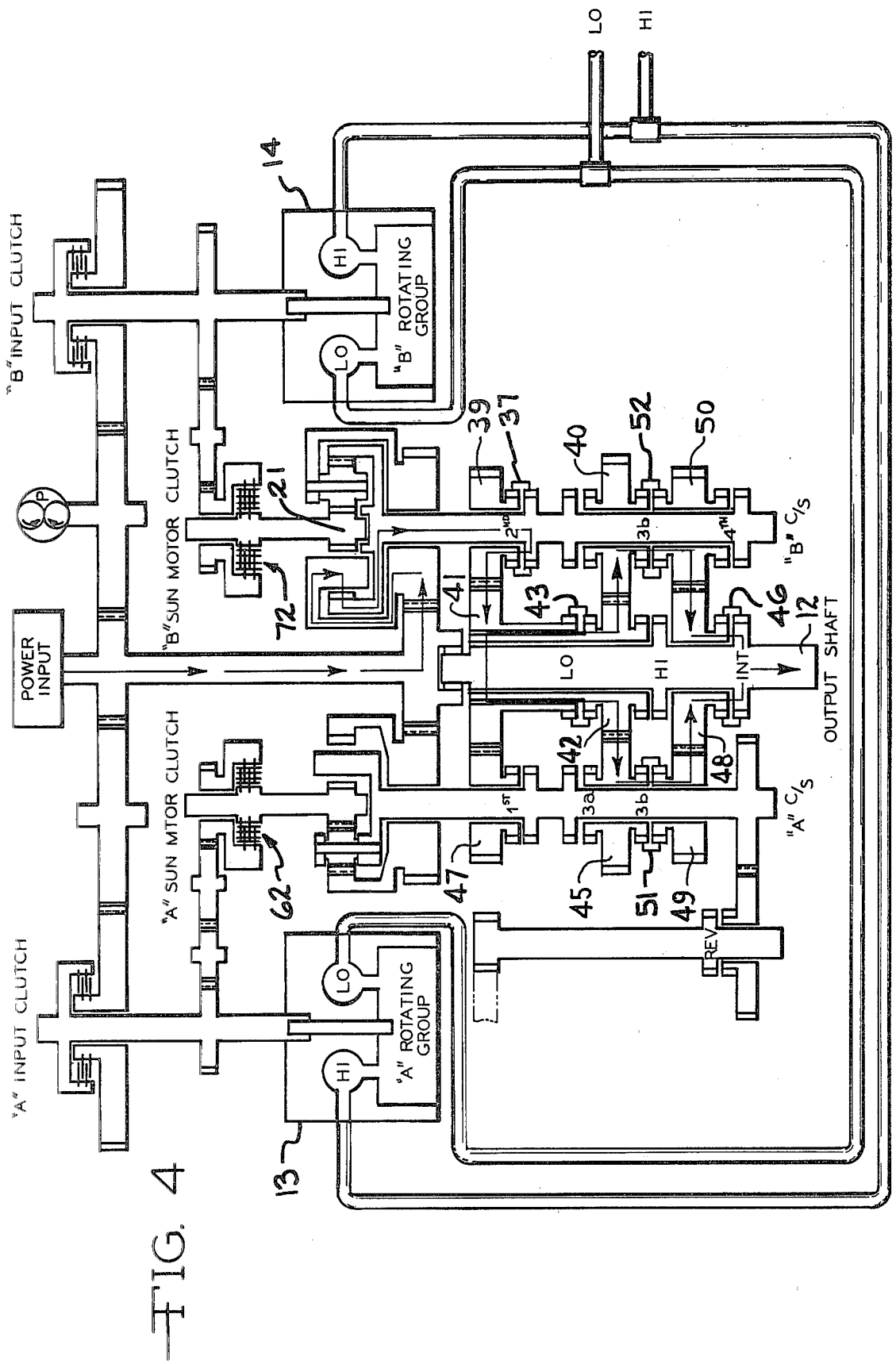

The gradual addition of hydraulic driving forces brings the output shaft 12 up to the fourth condition of operation, i.e. the second gear base speed (FIG. 4). At second base the output shaft speed is about 235 rpm (again assuming an engine speed of 1000 rpm).

In the second speed base only the "B" planetary system transmits power. The sun pinion 21 of the "B" planetary acts as a reaction member because the "B" sun motor clutch 72 is engaged and the "B" rotating hydraulic unit 14 is acting as a pump. Power flows from the carrier gear 22 of the "B" planetary through the ring gear 23 into the "B" countershaft. The second speed clutch 37 transmits power to second gear 39 and then to output shaft gear 41. Low speed clutch 43 transmits power to gear 42 which splits the power path through gears 45 and 49, and 40 and 50 as in the first three conditions of operation. Ultimately, power passes from the output gear 48 to the output shaft 12 through the engaged intermediate clutch 46. No power is being contributed by the "A" countershaft in second base and the clutch 27 (and therefore the first gear 47) can be automatically disengaged.

Figure 5:
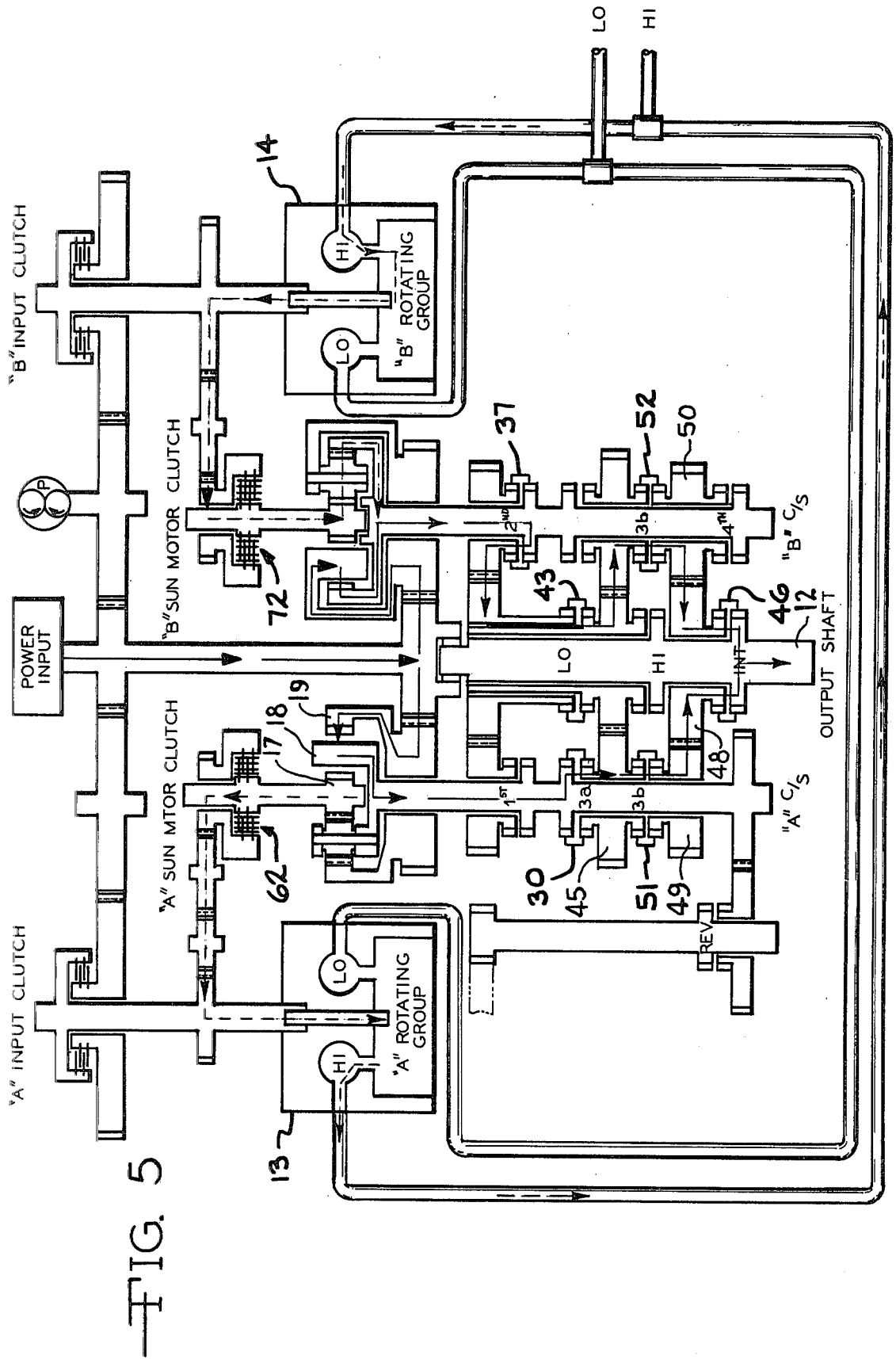

Assuming now that the desired forward speed is greater than that provided by an output shaft speed of 235 rpm. the transmission automatically shifts to allow operation in the fifth condition as shown in FIG. 5. The "A" countershaft clutch 30 is engaged thereby locking gears 45 and 49 to the "A" countershaft. Both the "A" sun motor clutch 62 and the "B" sun motor clutch 72 remain engaged. Driving force proceeds through the "B" planetary with the sun gear 21 thereof now acting as a reaction member receiving some torque from the "B" hydraulic unit 14 which now serves as a motor, being supplied with pressurized fluid from the "A" hydraulic unit 13 which is again acting as a pump. In the fifth condition of operation illustrated in FIG. 5 (i.e. from second base to third base) power continues to flow through the "B" planetary assembly and countershaft. However, power is also taken from the "A" ring gear 19 through the "A" carrier gear 18 into the "A" countershaft, with the "A" sun pinion 17 acting as a reaction member and driving the "A" hydraulic unit 13 as a pump. Because of the aforementioned clutch engagements torque also flows through the "A" countershaft into the output shaft 12 through gears 45, 49 and the engaged intermediate speed clutch 46. It should again be noted that output shaft gear 48 is driven simultaneously by identical gears 49 and 50.

The output shaft speed increases from 235 rpm. to approximately 366 rpm in this fifth condition until the swashplate of the "B" hydraulic unit is essentially perpendicular to its drive shaft 76 (i.e. is at an angle of zero). The "B" hydraulic unit thereby becomes blocked, which essentially stops rotation of the "A" unit and signals the control system that the output shaft 12 has arrived at third base.

Figure 6:
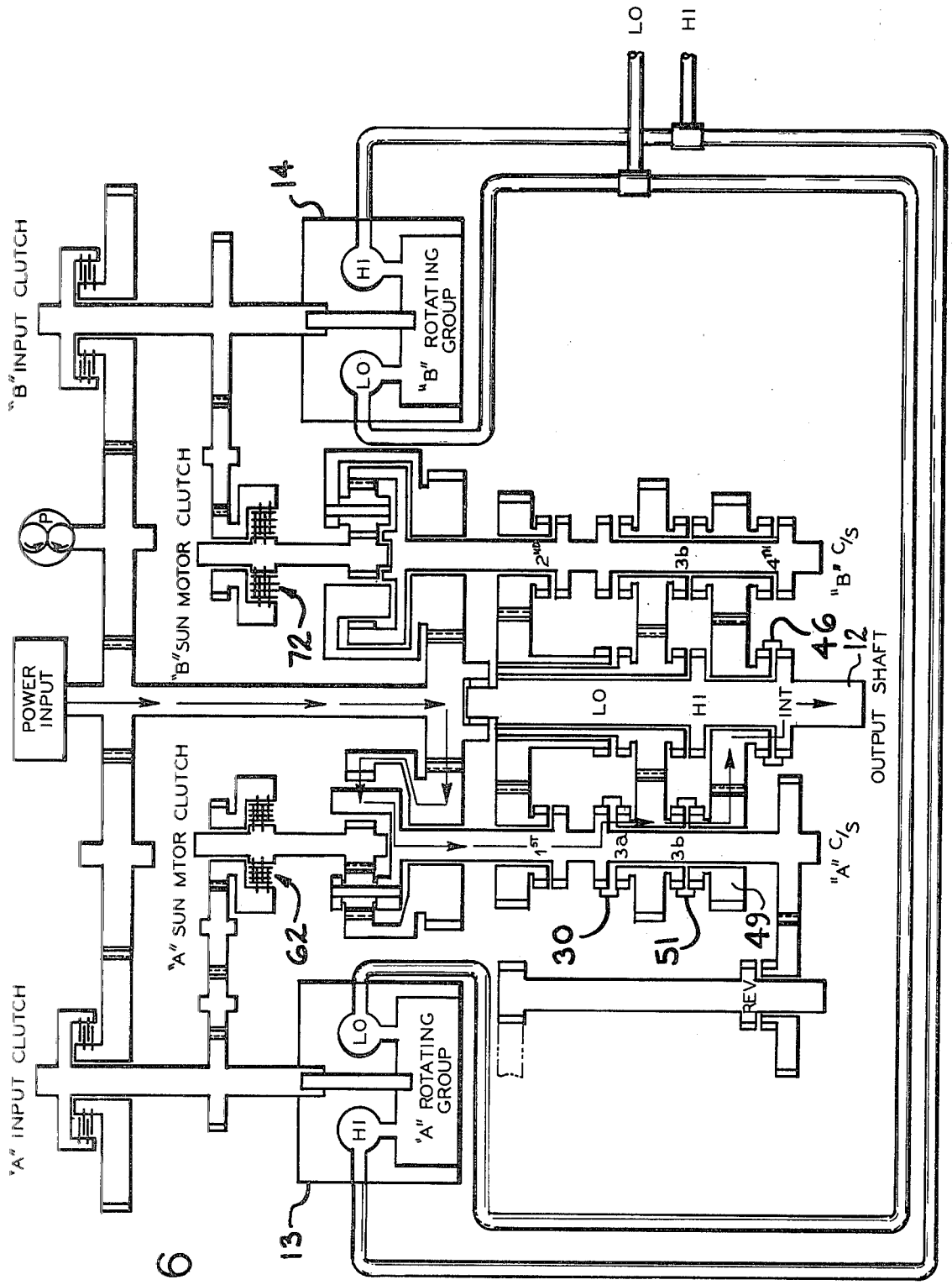

Third base (the sixth condition of operation) is shown in FIG. 6. The "B" countershaft contributes no torque to the output shaft 12 because the "B" unit 14 is set at a zero angle and therefore there is no reaction force available through the sun pinion 21. Drive torque is entirely through the "A" countershaft and through gear 45 to gear 49 to the output shaft 12. The output shaft speed at this fixed gear ratio is 366 rpm. The "B" countershaft dog clutches can now be disengaged without affecting torque flow through the transmission.

Figure 7:
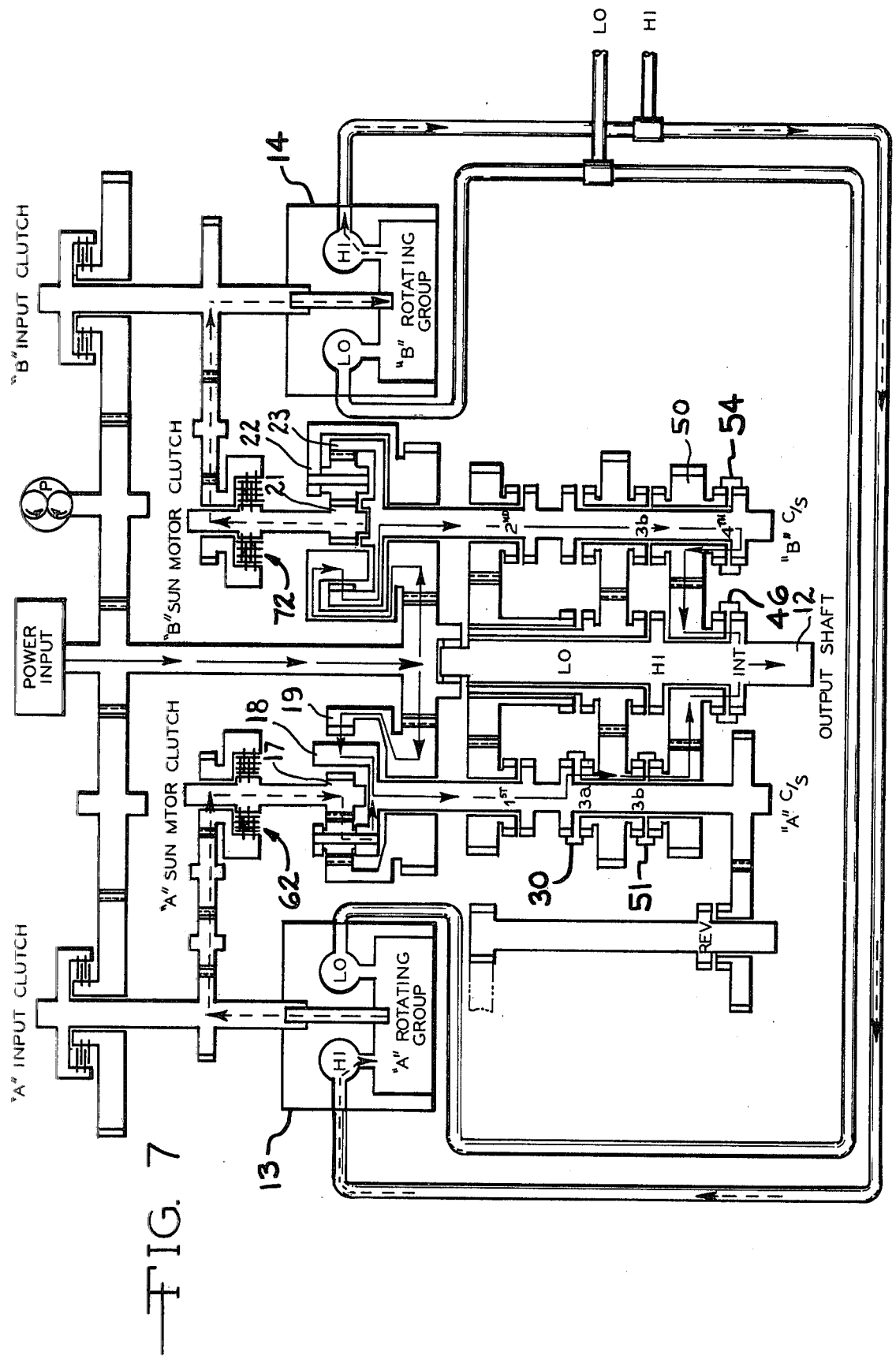

Assuming that the operator still wishes to increase the vehicle speed the transmission is automatically adapted for operation in the fourth mode (seventh condition of operation) as shown in FIG. 7 in which it moves from third base to fourth base. This adaptation consists of engaging "B" countershaft clutch 54. In the seventh condition the "A" hydraulic unit 13 is acting as a motor receiving pressurized flud from the "B" hydraulic unit 14 which is now acting as a pump. There is a reaction force in both sun pinions 17 and 21 and the drives are through both planetaries, the "B" planetary transmitting torque through the carrier gear 22 into the ring gear 23 and to the "B" countershaft, while the "A" planetary supplies added torque through the ring gear 19 into the carrier 18 and to the "A" countershaft. There is thus a contribution of the torque from the "A" hydraulic unit 13 through the "A" planetary into the "A" countershaft which then becomes additive to the torque from the "B" countershaft. "B" countershaft gear 50, through the fourth speed clutch 54 transfers torque from the "B" countershaft into the output shaft 12.

Figure 8:
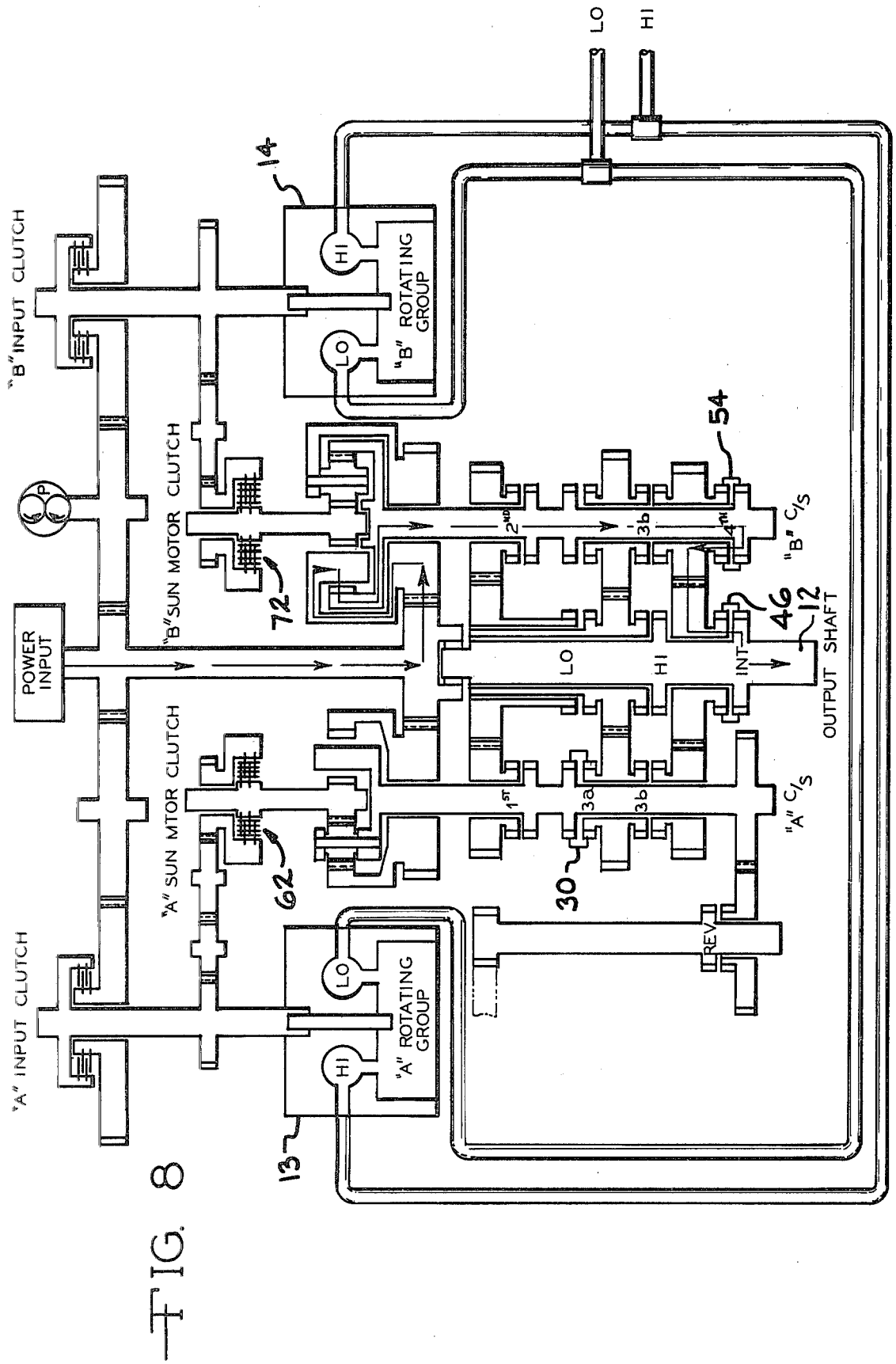

The seventh condition of operation persists until the output shaft speed becomes approximately 473 rpm, which corresponds to fourth base. Here, an automatic transmission shift is signaled because the swashplate angle of the "A" hydraulic unit 13 is functionally zero. Fourth base (i.e. the eighth condition of operation) is as shown in FIG. 8. It will be seen that the "A" countershaft is unloaded and all of the drive force is transmitted from the "B" planetary through the "B" countershaft. The reaction force through the "B" sun gear 21 is countered by the "B" hydraulic unit 14 which transfers no power to the "A" planetary. The "B" hydraulic unit 14 is capable of supplying hydraulic power to auxiliary units in the eighth condition of operation as in all other modes of the transmission where one or the other of the hydraulic units is acting as a pump.

Figure 9:
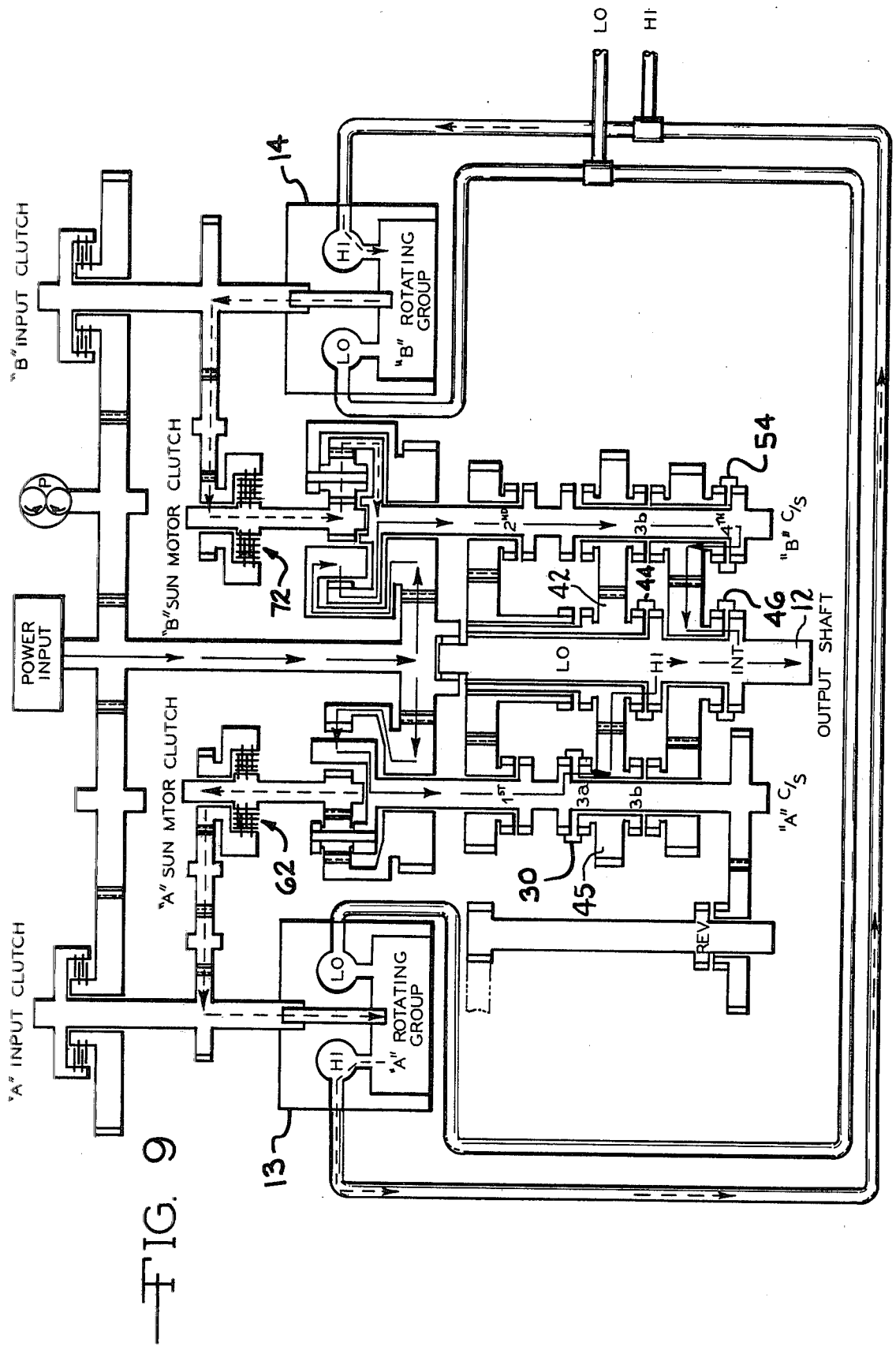

The transmission can be adapted for entry into the ninth condition of operation by engagement of the output shaft clutch 44 as shown in FIG. 9. The "B" hydraulic unit 14 acts as a motor while the "A" hydraulic unit 13 acts as a pump. The power path in the "B" countershaft is the same as that during fourth base. However, the "B" hydraulic unit 14 is acting as a motor to make an additional contribution of speed to the "B" countershaft. The "A" hydraulic unit 13, now acting as a pump absorbs the reaction forces from the "B" unit 14 and transmits torque from the input shaft 11, through the "A" planetary, "A" countershaft, gears 45 and 42 and to the output shaft 12 through the engaged high speed clutch 44. This fifth mode (i.e. from the fourth base to fifth base) will persist between the 573 rpm. output shaft speed to approximately 894 rpm. which represents fifth base. This fixed speed ratio condition (fifth base) represents the tenth condition of forward operation wherein the drive path is as indicated in FIG. 10.

Figure 10:
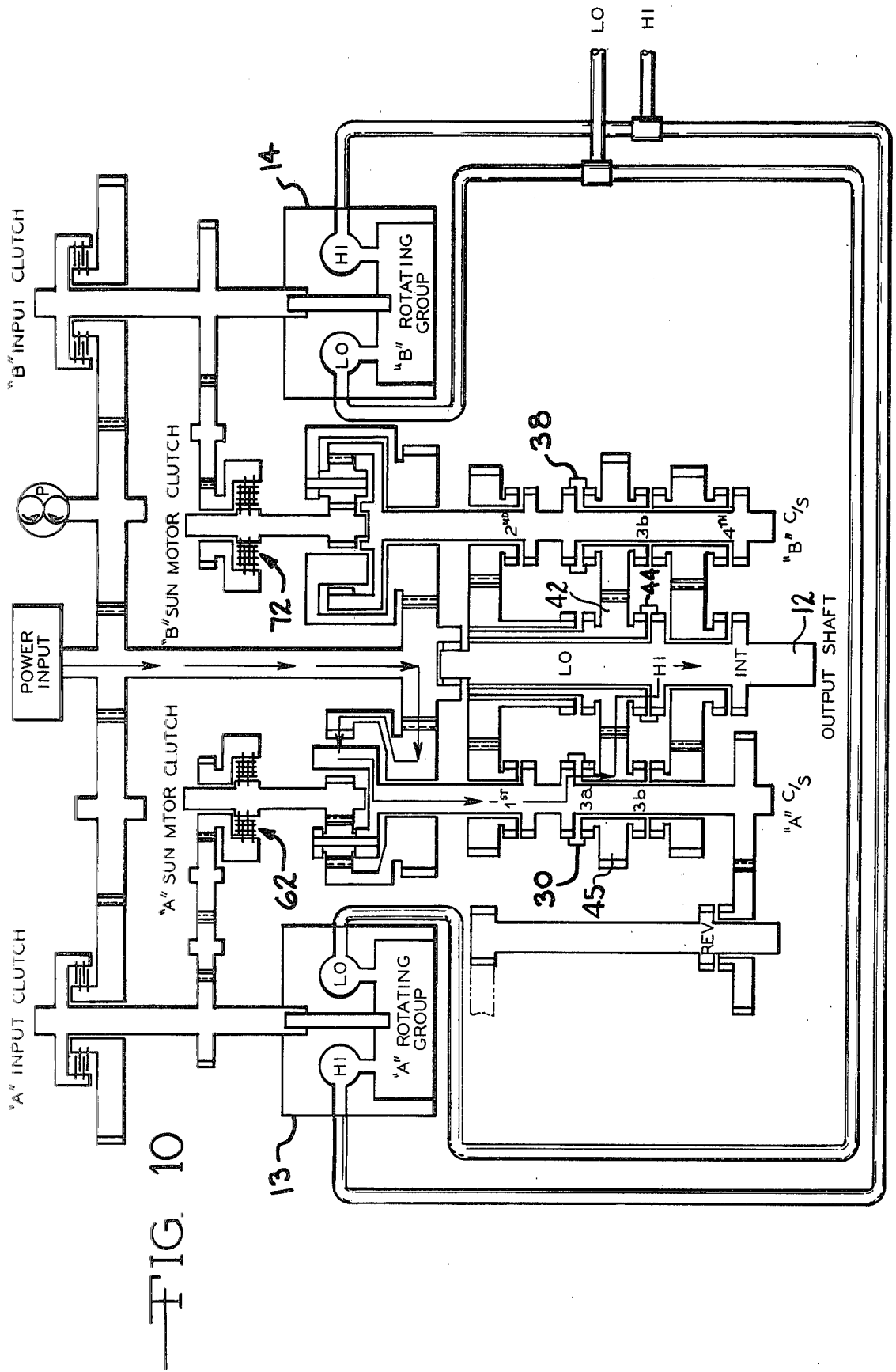

As shown in FIG. 10 the "B" hydraulic unit 14 is essentially unloaded and the "B" countershaft is contributing no torque. Output shaft clutch 46 can therefore be disengaged by the appropriate control. The output shaft clutch 54 can also be disengaged because gear 48 no longer transmits power to the output shaft. The drive path is now through the "A" planetary along with the "A" hydraulic unit 13 which acts as a pump. Torque is carried from the "A" countershaft to the gears 45 and 42 and their associated clutches, and then to the output shaft 12. The fourth speed clutch 54 remains engaged in preparation for the next condition of operation. The output shaft speed at fifth base is approximately 894 rpm.

Figure 11:
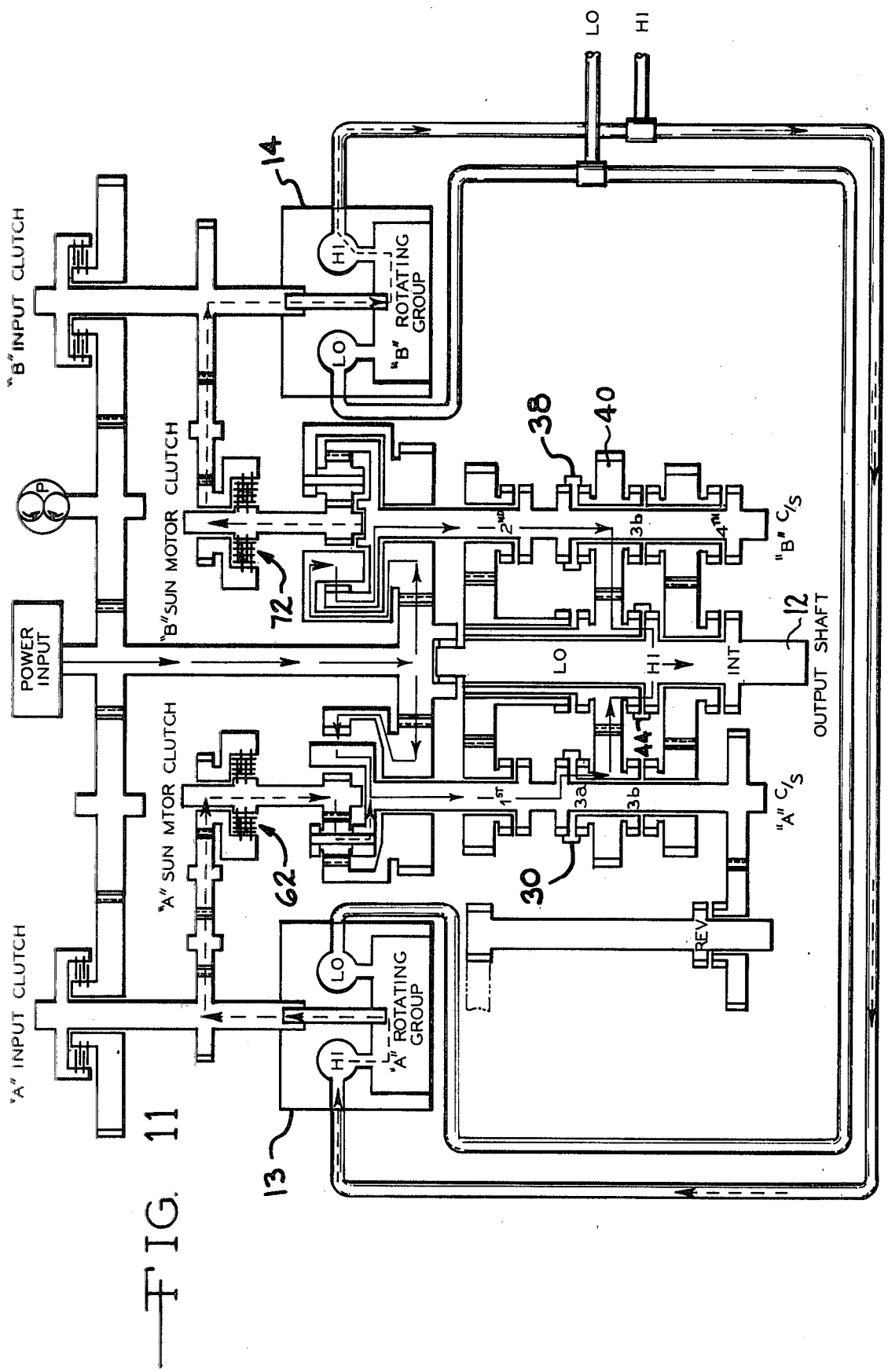

A further increase in speed will occur during the eleventh condition of operation shown in FIG. 11 as the transmission moves from fifth base to sixth base. The clutch 38 is engaged, thereby locking gear 40 to the "B" countershaft. The drive path through the "A" countershaft remains the same as in the tenth condition, except that the "A" hydraulic unit 13 is now acting as a motor and makes a contribution of torque to the "A" countershaft. The "A" unit 13 receives power from the "B" hydraulic unit 14 which is now acting as a pump. Torque from the "B" planetary is now applied to the output shaft 12 through the "B" countershaft and gear 40.

Figure 12:
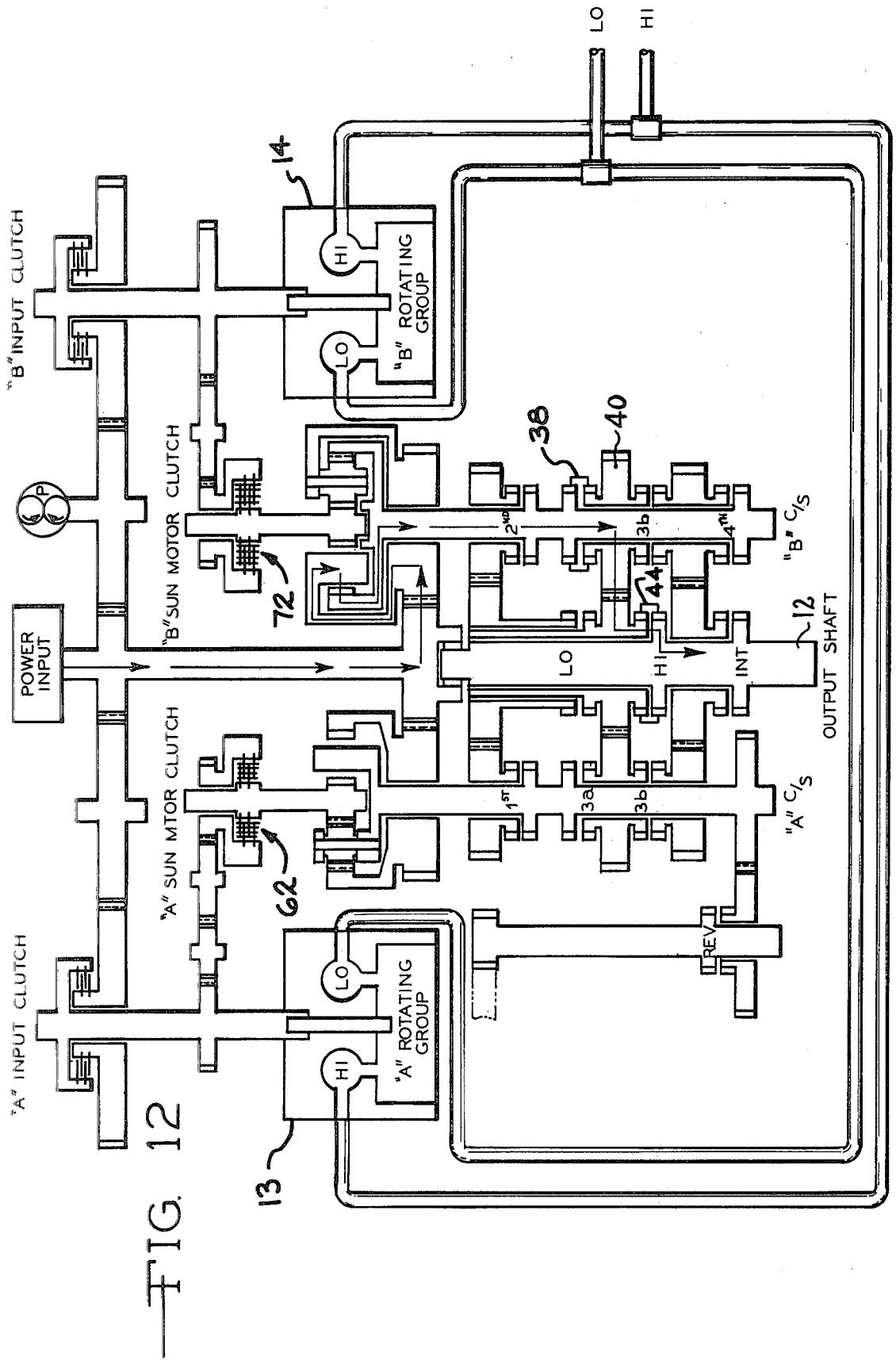

This eleventh condition (sixth mode) continues until stroke of "A" hydraulic unit 13 decreases to essentially zero and the "B" hydraulic unit approaches zero rotational speed wherein the transmission has completed its sixth base and the output shaft speed is approximately 1397 rpm (0.716 overdrive). The drive path in sixth base is as shown in FIG. 12. The "A" countershaft is fully unloaded and all power is transmitted through the "B" planetary into the "B" countershaft, with the "B" sun gear held stationary by the "B" hydraulic unit 14. Power flows from the "B" countershaft through the gear 40 and through the engaged high speed clutch 44 on the output shaft 12. This sixth base represents the normal high speed drive for the truck.

Figure 13:
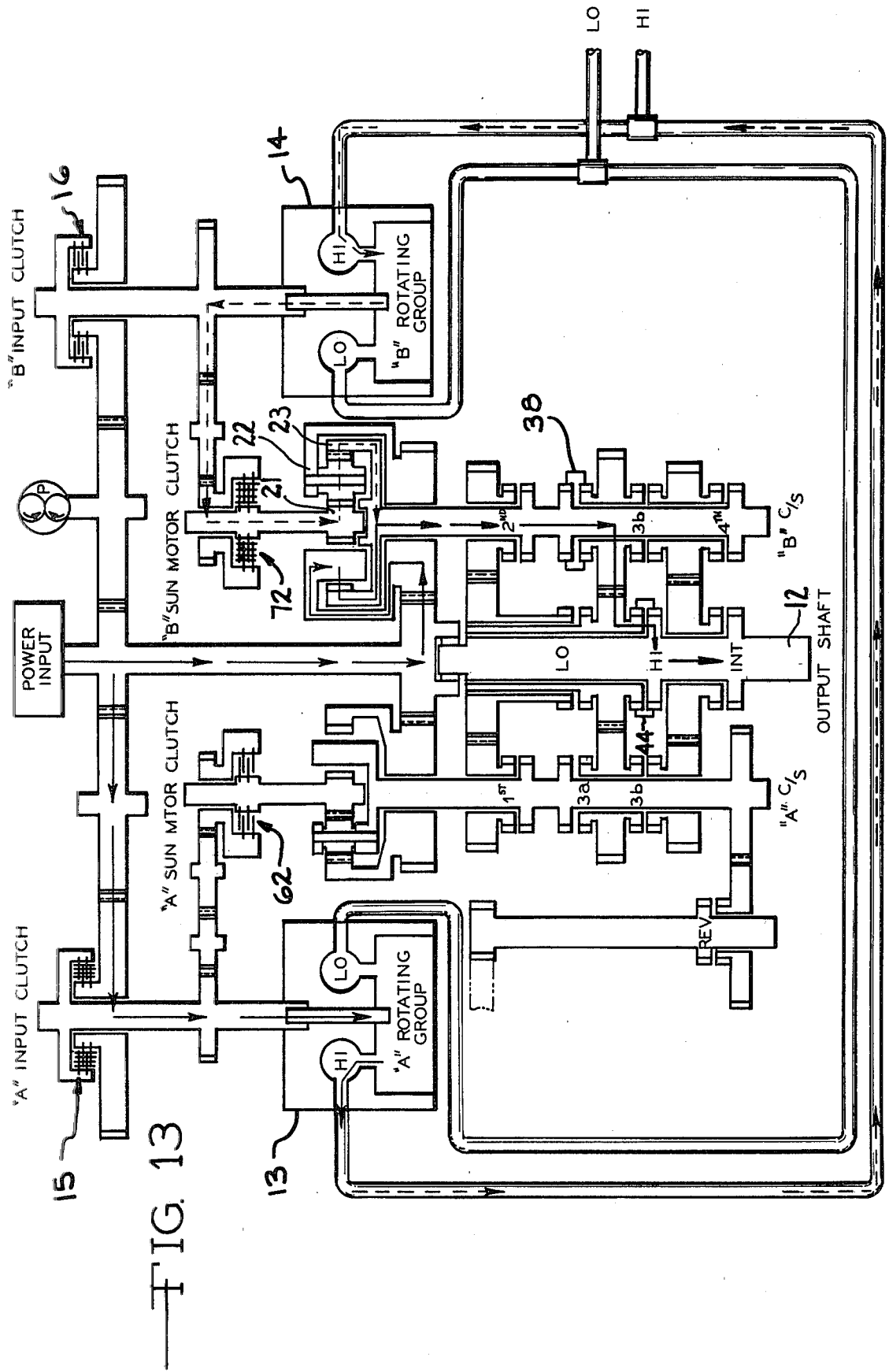

The transmission of the present invention is also provided with two additional forms of overdrive. The first of these is shown in FIG. 13 wherein the "A" sun motor friction clutch 62 is disengaged and the "A" input clutch 15 is engaged. Power from the engine is transmitted through the "A" input clutch 15 into the "A" hydraulic unit 13 which acts as a pump to supply fluid to the "B" hydraulic unit 14. The unit 14 acts as a motor to power the "B" countershaft through the "B" planetary ring gear 23. The countershaft and output shaft gear arrangements are the same as in sixth base shown in FIG. 12 but additional output shaft speed is provided by the "B" motor 14 driving the "B" sun gear 21 which drives the "B" ring gear 23 into overdrive. This additional speed may result in an output shaft speed of about 2178 rpm (0.46 overdrive) which is the maximum overdrive condition available with the particular embodiment of the invention disclosed herein.

Figure 14:
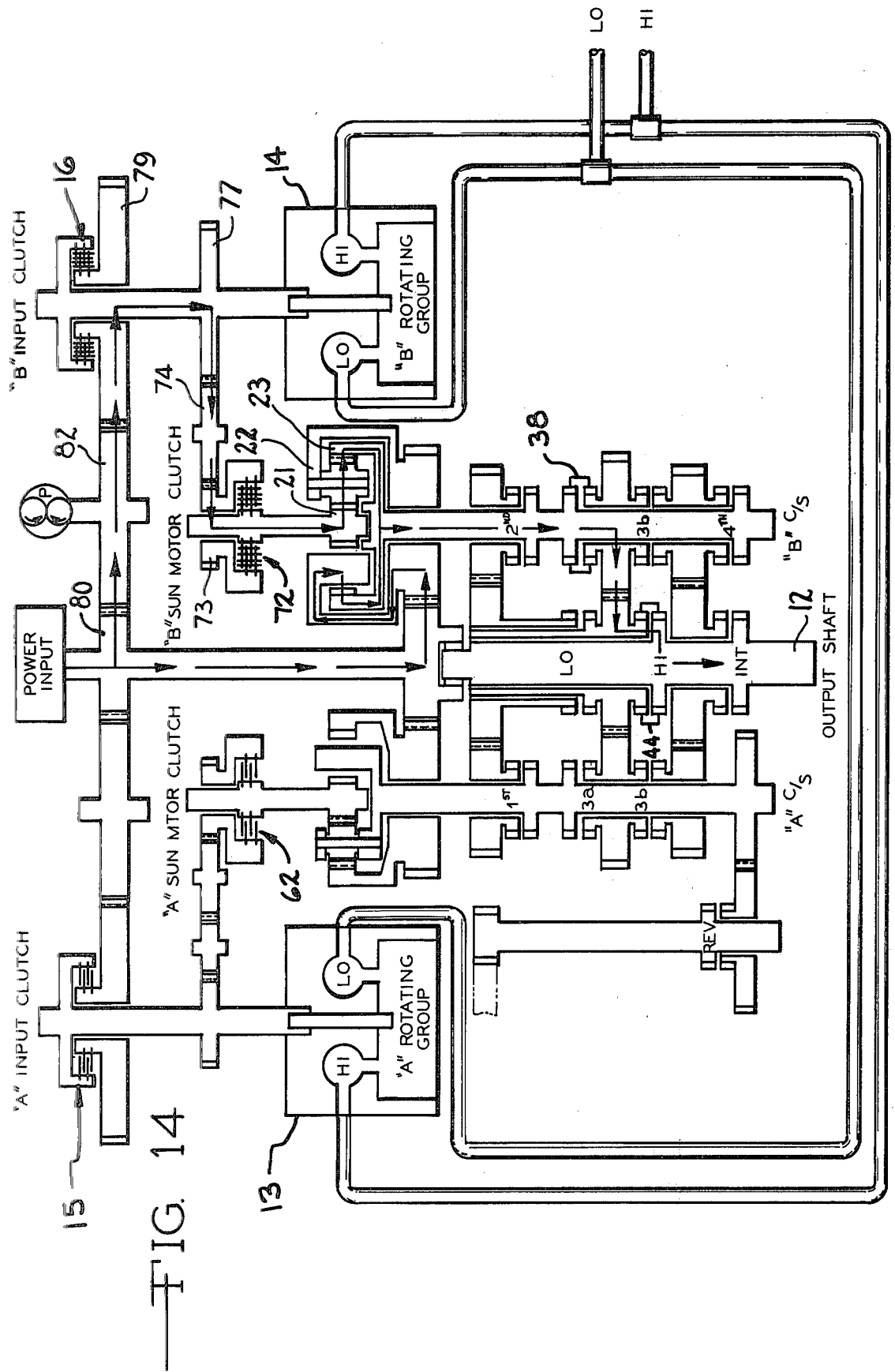

A second form of overdrive wherein all power is transmitted through mechanical gearing is also available and is shown in FIG. 14. The "B" input and sun motor clutches 16 and 72 are engaged so that power from the engine flows through gears 80, 82, 79, 77, 74, and 73 into the "B" sun gear 21 and through the "B" planetary to the B countershaft. This totally geared condition gives the same 2178 rpm output shaft speed capability as the previously described hydraulic overdrive. This geared overdrive can be termed the fourteenth condition or sixth gear overdrive. It should be noted that a pure mechanical overdrive is available at every base speed by engaging clutches 16 and 72 or 15 and 62. In geared overdrive both hydraulic units are set to zero swashplate angle (i.e. zero displacement) and neither actually acts as a pump or a motor.

Figure 15:
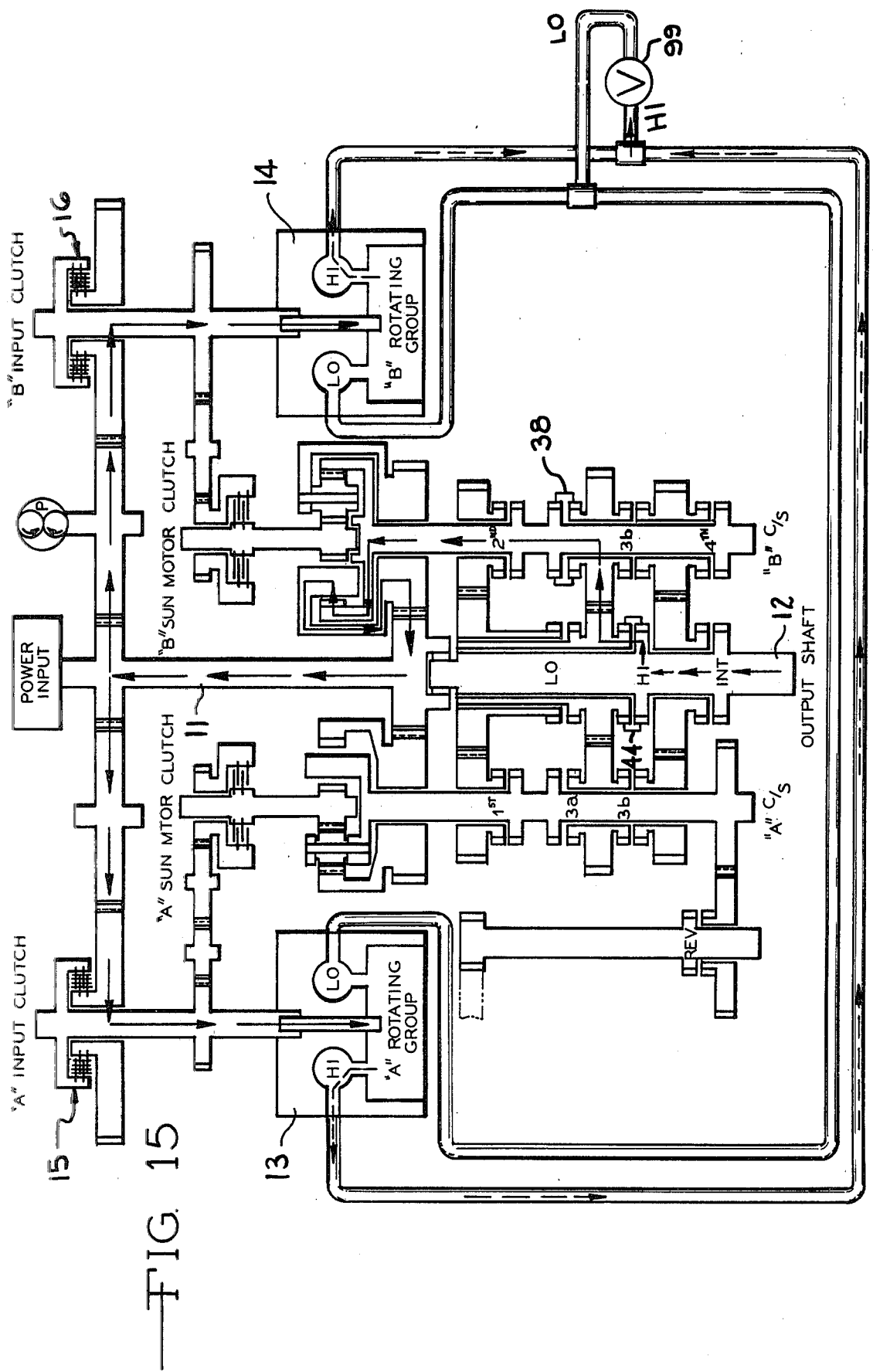

The transmission of the present invention has a distinct advantage over transmissions previously known in the art because it possesses the capability of dynamically braking the associated vehicle. By engaging both the "A" and "B" input clutches 15 and 16 as shown in FIG. 15 the hydraulic units 13 and 14 are drivingly engaged with the input shaft 11. When the units are each set at some stroke other than zero each unit 13 and 14 is transformed into a high output pump. Pressurized fluid in the hydraulic system is then poured over a fixed setting relief valve 99 which acts as a hydraulic load on the system. Braking effort is controlled by modulating the stroke of the hydraulic units 13 and 14. Braking horsepower is thereby varied by the stroke settings of these units. A desired relief valve may give as much as 450 horsepower of dynamic braking in this preferred embodiment which will notably assist slowing down even the heaviest vehicle. It should be noted that dynamic braking can occur with only one of the input clutches 15 or 16 engaged, whereby only one unit 13 or 14 is utilized. However, only about half the braking horsepower is available. The gear arrangement may be the same as described for the geared over drive condition (FIG. 14) although dynamic braking can be made available in any condition of operation simply by engaging the "A" or "B" input clutches 15 and/or 16. It can therefore be seen that the transmission of the present invention can be switched from a high dynamic braking mode to a drive mode without a gear changing operation. Preferably the relief valve system includes a heat exchanger (not shown) to prevent overheating of the hydraulic fluid if the dynamic braking condition persists for any extended periods of time.

Referring again to FIG. A, a hydraulic pump or motor 100 may be substituted for the relief valve 99 and the dynamic braking forces can thereby be utilized to drive accessories, such as a cement mixer. The hydraulic motor 100 may be of the fixed or variable setting type. Furthermore, the hydraulic motor 100 may be utilized to drive a hydraulic device 101 such as propeller, or a fan which dissipates heat to the atmosphere. Other types of energy dissipating devices 101 may also be used in conjunction with the hydraulic motor 100, such as an air compressor, blower, turbo supercharger, etc.

Figure 16:
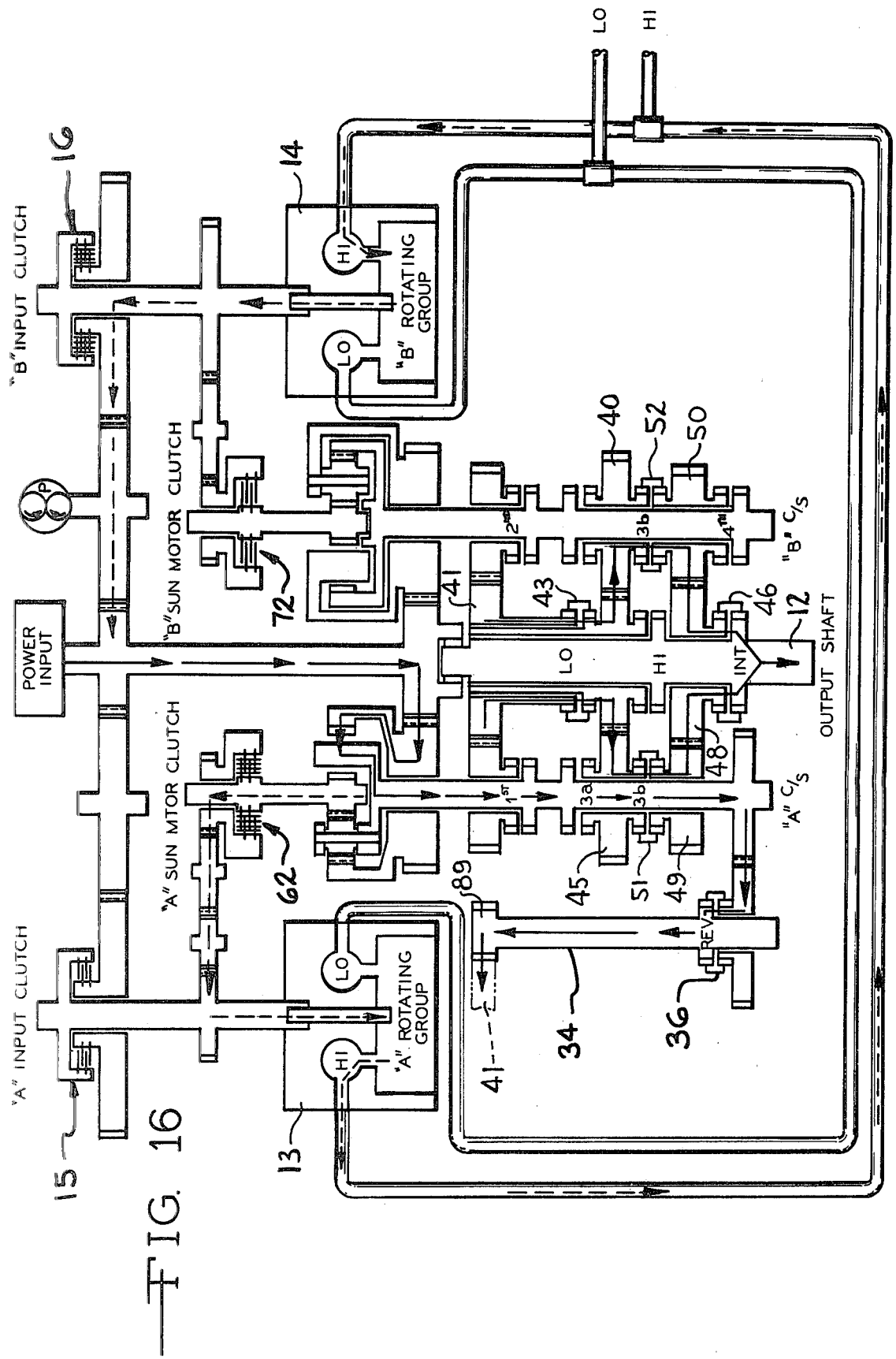

A reverse drive condition is shown in FIG. 16 wherein the "B" input clutch 16 and "A" sun motor clutch 62 are engaged. The gear arrangement is the same as in the regenerative starting condition (FIG. 1) but, in addition, the clutch 36 on the reverse countershaft 34 is engaged. The direction of rotation imparted from the "A" countershaft to the output shaft is now reversed. For example, clockwise rotation of the "A" countershaft imparts a counterclockwise rotation of the reverse shaft 34. Power is transmitted through gears 41 and 42 to the "A" countershaft gears 45 and 49 and to the "B" countershaft gears 40 and 50 to output shaft gear 48 which provides a counterclockwise rotation to the output shaft 12. The maximum reverse output shaft speed in the present embodiment is about 102 rpm. for 1000 rpm. input speed.

Figure 17:
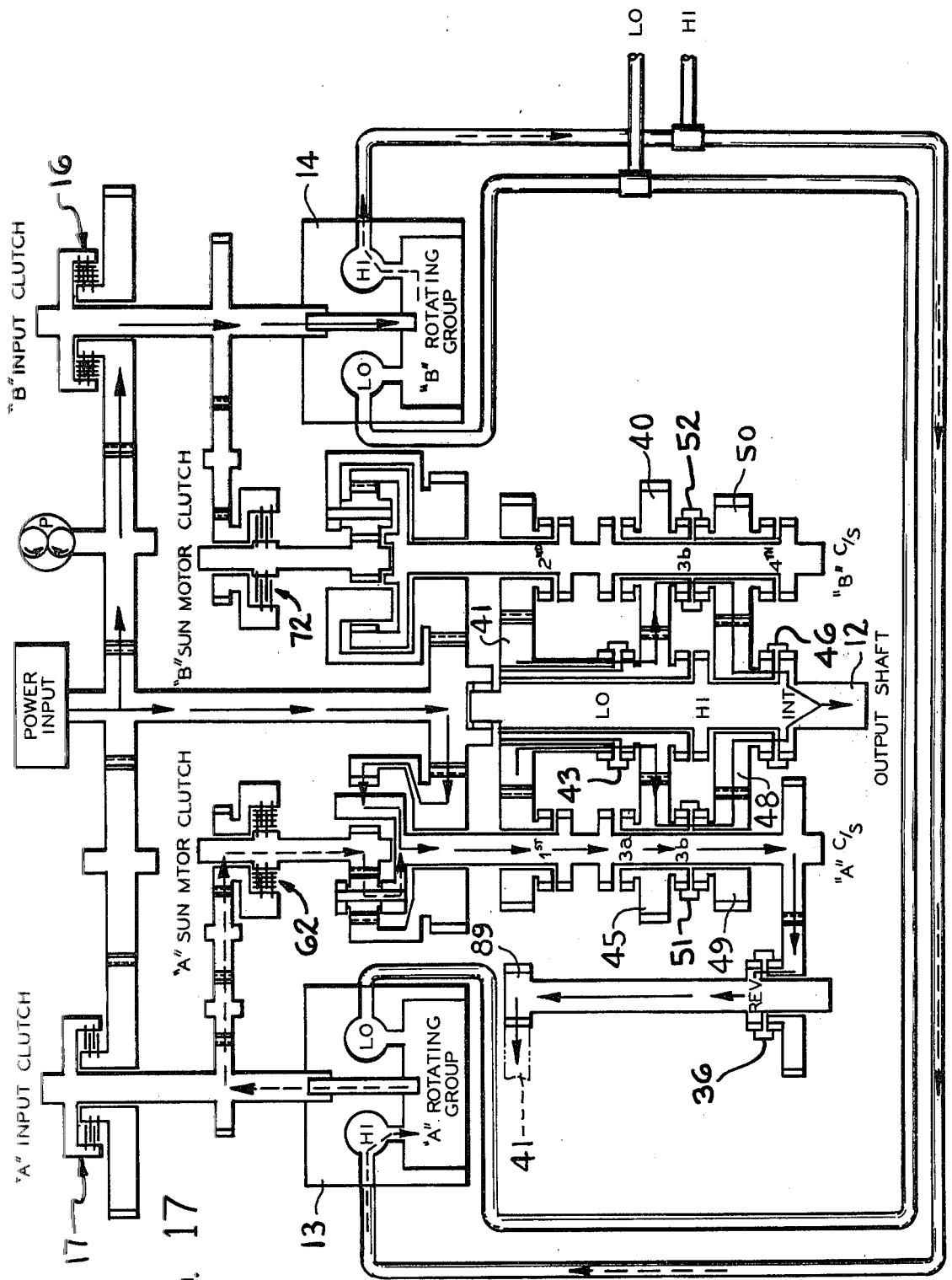

A reverse overdrive condition of operation is shown in FIG. 17. The "B" input clutch 16 remains engaged to drive the "B" hydraulic unit 14 as a pump and the "A" hydraulic unit 13 as a motor to add speed to the "A" countershaft through the "A" planetary. Dog clutches 43, 46, 51 and 52 are engaged while the reverse clutch 36 remains engaged. The "B" hydraulic unit supplies pressured fluid to the "A" hydraulic unit which acts as a motor, as above set forth.

POWER TAKE-OFF CAPABILITIES

As previously mentioned, power take-off (PTO) systems are highly desirable and widely used in several heavy duty vehicles such as cement mixers, bulldozers, refuse collectors, etc. The transmission of the present invention has the capabilities of providing engine and/or road speed driven mechanical, as well as hydraulic auxiliary driven power take off motors.

Referring again to FIG. A, a mechanically driven pump 83 is driven by gear 82 which derives power from the input shaft 11. It should be noted that additional pumps such as 83 can easily be driven off of other mechanically driven transmission components such as the input shaft 11, components of either hydraulic unit 13 and 14, and either countershaft and its associated gearing. These mechanical PTO's will not be discussed in detail as they are well known in the art.

The transmission of the present invention also has continuous auxiliary hydraulic PTO capability. Fluid in the high pressure line 28 of the manifold of the hydraulic system is always pressurized when the transmission is in any operating mode previously described. A PTO can be driven by bleeding the high pressure side 28 of the hydraulic system. Furthermore, when the vehicle is stopped, the input clutches 15 and 16 may be engaged while the sun clutches 62 and 72 are disengaged. The transmission is therefore in a neutral position while both hydraulic units 13 and 14 are operatively engaged and capable of supplying hydraulic power to a PTO. High pressure take-off line 88 can therefore be tapped at any time during operation to power in auxiliary drive unit.

In the presently preferred embodiment, hydraulic fluid under high pressure always passes through the same conduit or line 28 in the fluid manifold. The high fluid pressure is maintained in a single passageway because of the unique planetary gear arrangement which allows the direction of rotation of each hydraulic unit 13 and 14 is reversed each time it is converted from a pump to a motor or from a motor to a pump.

It is therefore always assured that hydraulic PTO's are continuously driven in one direction. It should be noted that the fluid pressure in the high pressure manifold 28 may reach 6000 PSI under some operating conditions. Because of the single high pressure side 26, the external plumbing costs of the hydraulic system are reduced.

In Figure A a fixed displacement hydraulic motor 100 is operably inserted in the high pressure hydraulic take off line 88. The motor 100 may be utilized, for example, to turn a concrete mixing drum mounted on the associated vehicle. Low pressure fluid is returned by the pump 100 to the low pressure fluid return line 86 to the low pressure conduit 28 of the hydraulic fluid manifold.

The system of the presently preferred embodiment has the advantage of utilizing the necessary components present in the transmission, mainly the fluid reservoir, heat exchanger filtration system, and high capacity variable displacement pumps.

Although the foregoing structure has been described for the purpose of illustrating a presently preferred embodiment of the invention, it should be understood that many modifications or alterations may be made without departing from the spirit and the scope of the invention as set forth in the appended claims.

I claim:

1. A transmission comprising:
    an input shaft, first and second countershafts drivable by said input shaft, and an output shaft, said output shaft having at least one gear and each of said countershafts having at least one gear in constant mesh with an output shaft gear, at least one of said countershaft and output shaft gears being clutchable to its associated shaft, whereby said output shaft and at least one of said countershafts are selectively engageable;
    first and second planetary gear assemblies, each of said assemblies comprising a sun gear component, a carrier component, a plurality of planet gears mounted on said carrier component and adapted for driving engagement with said sun gear component, and a ring gear component adapted for driving engagement with said planet gears;
    means for drivingly engaging said first and second planetary gear assemblies, said means comprising an hydraulic system having first and second interconnected hydraulic units, said first hydraulic unit drivably associated with said first planetary gear assembly and said second hydraulic unit drivably associated with said second planetary gear assembly;
    wherein one of said first planetary gear assembly components and a different one of said second planetary gear assembly components are drivingly engaged with said input shaft; and
    wherein one of said first planetary gear assembly components is drivingly engaged with said first countershaft and one of said second planetary gear assembly components is drivingly engaged with said second countershaft.

2. A transmission as defined in claim 1 wherein each of said first and second hydraulic units is drivably associated with said input shaft.

3. A transmission as defined in claim 1 wherein said first hydraulic unit is drivably associated with said sun gear component of said first planetary gear assembly and said second hydraulic unit is drivably associated with said sun gear component of said second planetary gear assembly.

4. A transmission as defined in claim 1 wherein said one of said first planetary gear assembly components drivingly engaged with said input shaft is said ring gear component and wherein said different one of said second planetary gear assembly components drivingly engaged with said input shaft is said carrier component.

5. A transmission as defined in claim 4 wherein said one of said first planetary gear assembly components drivingly engaged with said first countershaft is said carrier component and wherein said one of said second planetary gear assembly components drivingly engaged with said second countershaft is said ring gear component.

6. A transmission as defined in claim 1 wherein said hydraulic system comprises first and second fluid passageways from said first hydraulic unit to said second hydraulic unit, each of said passageways containing fluid, and wherein said fluid contained in said first passageway has a higher pressure than said fluid contained in said second passageway at all operating modes of said transmission.

7. A transmission as defined in claim 1 wherein said hydraulic units are interconnected by a fluid passageway and wherein said hydraulic system comprises a fluid relief valve for dynamically braking a vehicle in which said transmission is utilized, said valve operatively connected with said fluid passageway.

8. A transmission as defined in claim 1 wherein said hydraulic units are interconnected by a fluid passageway and wherein said hydraulic system comprises a hydraulic power take-off means for driving auxiliary hydraulic accessories, said power take-off means operatively connected with said fluid passageway.

9. A transmission as defined in claim 1 wherein each of said countershafts has an axis of rotation, said axes being spaced from each other.

10. A transmission as defined in claim 9 wherein said input shaft is adapted to drive said one of said first planetary gear assembly components and said first different one of said second planetary gear assembly components in different rotational directions.

11. A transmission as defined in claim 1 wherein each of said countershafts includes a plurality of selectively engageable drive gears, wherein said drive gears of said first countershaft are substantially identical to said drive gear of said second countershaft.

12. A transmission as defined in claim 1 wherein said hydraulic units are connected by a fluid passageway and wherein said hydraulic system further comprises a hydraulic motor drivable by pressurized fluid said motor capable of dissipating energy of said fluid without substantially heating said fluid.

13. A transmission as defined in claim 1 wherein said means for drivingly engaging said first and second gear assemblies is selectively engageable.

14. A transmission as defined in claim 1 wherein said means for engaging said gear assemblies comprises a hydraulic system having a modulatable first hydraulic unit drivably associated with said first gear assembly, a second modulatable hydraulic unit drivably associated with said second gear assembly and a hydraulic device; wherein said transmission further comprises means for dynamically braking said input shaft by selectively modulating said hydraulic units to control flow of pressurized hydraulic fluid to said hydraulic device.

15. A transmission as defined in claim 14 wherein said hydraulic device is a fixed setting relief valve.

16. A transmission as defined in claim 14 wherein said hydraulic device is a hydraulic motor adapted to drive an energy dissipating device.

17. A transmission as defined in claim 16 wherein said hydraulic motor is a variable hydraulic motor.

18. A transmission as defined in claim 14 wherein said hydraulic system further comprises means for regenerating power from said input shaft through said hydraulic units when said output shaft is substantially at zero rotational speed.

* * * * *